United States Patent
Tanutama et al.

(10) Patent No.: US 10,697,811 B2
(45) Date of Patent: Jun. 30, 2020

(54) METHOD, APPARATUS AND COMPUTER PROGRAM PRODUCT FOR PROVIDING SENSOR DATA COLLECTION AND SENSOR CONFIGURATION

(71) Applicant: Nokia Technologies Oy, Espoo (FI)

(72) Inventors: Mikhael Tanutama, Milpitas, CA (US); Muneem Shahriar, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 15/338,582

(22) Filed: Oct. 31, 2016

(65) Prior Publication Data
US 2018/0120132 A1     May 3, 2018

(51) Int. Cl.
G01D 18/00     (2006.01)
G01D 21/00     (2006.01)

(52) U.S. Cl.
CPC ............. *G01D 18/00* (2013.01); *G01D 21/00* (2013.01)

(58) Field of Classification Search
USPC ........................................................ 702/104
See application file for complete search history.

(56) References Cited

U.S. PATENT DOCUMENTS

| | | | | |
|---|---|---|---|---|
| 5,680,409 | A * | 10/1997 | Qin | ........................ G05B 9/02 702/116 |
| 7,016,812 | B2 * | 3/2006 | Aritsuka | ................... G06F 8/60 482/8 |

(Continued)

FOREIGN PATENT DOCUMENTS

| | | |
|---|---|---|
| EP | 1722310 | 11/2006 |
| KR | 2015 0101892 A1 | 9/2015 |

(Continued)

OTHER PUBLICATIONS

Crilly, P. et al., *Using Smart Phones and Body Sensors to Deliver Pervasive Mobile Personal Healthcare*, (2010) [retrieved Dec. 7, 2016]. Retrieved from the Internet: <URL: http://www98.griffith.edu.au/dspace/bitstream/handle/10072/37264/68839_1.pdf?sequence=1> 6 pages.

(Continued)

*Primary Examiner* — Paul D Lee
(74) *Attorney, Agent, or Firm* — Alston & Bird LLP

(57) ABSTRACT

A method, apparatus and computer program product provide data collection via a plurality of sensors, user authentication, data storage, and sensor replacement and configuration. The sensors may be integrated in or on various types of devices and/or household objects and may provide a wide range of data regarding users, use of the respective items, and/or their environments. Sensor data may be processed by the disclosed apparatus to generate application output data. Replacement sensors may be manually or automatically detected and configured. Multiple users may use a sensor and/or associated device, and may be authenticated with biometric data or/and other forms of authentication. The data may therefore be associated with the intended user. Authentication, data storage, application computer program code hosting, analytical processing, and/or the like may be performed on computing devices that are remote from the disclosed apparatus. Cost effective updates and replacements of sensors and/or devices may be provided.

21 Claims, 16 Drawing Sheets

(56) References Cited

U.S. PATENT DOCUMENTS

| | | | |
|---|---|---|---|
| 9,063,811 B2 | 6/2015 | Stekkelpak et al. | |
| 9,111,214 B1 | 8/2015 | Sharma et al. | |
| 2013/0061456 A1 | 3/2013 | Lefaure et al. | |
| 2014/0076022 A1 | 3/2014 | Ohlsson et al. | |
| 2014/0358734 A1* | 12/2014 | Sehgal | G06F 8/654 705/27.1 |
| 2016/0150021 A1 | 5/2016 | Britt et al. | |
| 2017/0203030 A1* | 7/2017 | Brewer | A61M 5/14244 |

FOREIGN PATENT DOCUMENTS

| | | |
|---|---|---|
| WO | WO-2013/056194 | 4/2013 |
| WO | WO-2014/202250 | 12/2014 |
| WO | WO 2015127056 | 8/2015 |
| WO | WO 2016085214 | 6/2016 |
| WO | WO 2016111916 | 7/2016 |

OTHER PUBLICATIONS

Gay, V. et al., *A Health Monitoring System Using Smart Phones and Wearable Sensors*, International Journal of ARM, vol. 8, No. 2 (Jun. 2007), Retrieved from the Internet: <URL: https://www.researchgate.net/publication/228343525_A_health_monitoring_system_using_smart_phones_and_wearable_sensors> 9 pages.

Satheeshkumar, S. et al., *An Integrated System approach for Monitoring Patient Health using Wearable Sensors*. [Retrieved Dec. 7, 2016]. Retrieved from the Internet: <URL: https://www.google.co.in/url?sa=t&rct=j&q=&esrc=s&source=web&cd=4&ved=0ahUKEwiwoKrv1PzNAhUHM48KHbe5ChsQFgg1MAM&url=http%3A%2F%2Fwww.academicscience.co.in%2Fadmin%2Fresources%2Fproject%2Fpaper%2Ff201510261445881970.docx&usg=AFQjCNGHLgGFPW6G-yHsniJXEUqWMCLt9Q&sig2=M1zakkkm-bIk6eW-SDDCBQ&bvm=bv.127178174,d.c2I&cad=rja>. 4 pages.

Yi, W.J. et al., *System Architecture and Design Flow of Smart Mobile Sensing Systems*, Journal of Sensor Technology, (2013) 47-56, Retrieved from the Internet: <URL: http://file.scirp.org/pdf/JST_2013090609191989.pdf>.

International Search Report and Written Opinion of International Searching Authority for International Patent Application No. PCT/FI2017/050739 dated Feb. 8, 2018, 17 pages.

Extended European Search Report for Application No. 1786383.0 dated May 20, 2020, 28 pages.

Schmitt, M. et al., Dynamic Reconfiguration of Intelllgent Field Devices by Using Modular Software Applications, IFAC-Papersonline, vol. 48, No. 3 (2015) 561-566.

* cited by examiner

METHOD, APPARATUS AND COMPUTER PROGRAM PRODUCT FOR PROVIDING SENSOR DATA COLLECTION AND SENSOR CONFIGURATION

TECHNOLOGICAL FIELD

An example embodiment of the present disclosure relates generally to data collection, and more particularly, to a method, apparatus and computer program product for providing data collection via a plurality of sensors. The method, apparatus and computer program product also provide user authentication, data storage, data analytics, sensor replacement, or sensor configuration.

BACKGROUND

The advancement of computing technology has led to sensor devices being used in many aspects of life. In some objects, such as user devices, household products, appliances and the like, integrated sensors detect information regarding users and the usage of the corresponding object. The data may be detected, stored, and analyzed according to software packages designed to interpret the sensor data.

Many users, however, wish to collect digital information in a seamless manner that is integrated with their everyday tasks and activities without excessive installation and configuration of software. Further, as new, upgraded, and improved products are made available, many users do not want to spend excessive amounts of money replacing their products that have working components with entire new products which duplicate many components of an otherwise functioning device.

BRIEF SUMMARY

A method, apparatus, and computer program product are therefore provided in accordance with an example embodiment for providing data collection via one or more sensors, (i.e. one or more sensor devices). Certain example embodiments may further provide automatic or manual sensor configuration and replacement, user authentication and registration, data storage and data analytics. An apparatus according to an example embodiment may be configured as a hub to receive data from the one or more of sensor devices. In some examples, an object, such as a mobile device, fitness tracker, medical device, household appliance, for example vacuum cleaner or refrigerator, house automation appliance, for example garage door opener, home security appliance, vehicle, and/or the like may comprise the one or more sensors and/or sensor devices. In some examples, an object may comprise a human, animal, or any part of the human or the animal.

The one or more sensors devices may be configured to detect data from their respective environments, users, and/or associated objects in a variety of ways. For example, the sensors may include accelerometers configured to detect motion data, biometric sensors configured to collect biometric data from a user, and/or the like.

The method, apparatus, and computer program product provided herein may be configured to communicate with numerous different sensors and/or sensor devices, and to access related application computer program code associated with an identified sensor and/or sensor device. An example embodiment may update the application computer program code over time as new application computer program code associated with a sensor becomes available.

The application computer program code may direct an example embodiment to collect, process and/or cause storage the data. In some embodiments, the application computer program code may indicate an application context, such as the usage of a sensor (e.g., object type in which the sensor is located, what type of data is provided by the sensor, and/or a determined status of the user or associated object). As another example, the application context, or context, may provide a status of the associated sensor.

An example embodiment may further access additional remote computing devices, for data storage, application computer program code downloads and updates, data analytics, user profile service, authentication, and/or the like. In some examples application output data may be provided to a remote user device via user interface. In this regard, a user may view analytical data or other outputs regarding the use of a plurality of sensors, from a user device such as a smartphone, and via a user interface (e.g., display) provided by an example embodiment.

An apparatus is provided according to an example embodiment comprising at least one processor and at least one memory including computer program code. The at least one memory and the computer program code are configured to, with the processor, cause the apparatus to at least receive an indication of at least one sensor associated with an object. The at least one memory and the computer program code are configured to, with the processor, cause the apparatus to, in response to receiving the indication of the at least one sensor, determine application requirements associated with the at least one sensor. In some embodiments, the at least one memory and the computer program code are configured to, with the processor, cause the apparatus to cause transmission of a request to a remote computing device for compatible application information based on the application requirements associated with the at least one sensor. The at least one memory and the computer program code is configured to, with the processor, cause the apparatus to receive application computer program code from the remote computing device based on at least the compatible application information, and receive sensor data from the at least one sensor. The at least one memory and the computer program code is configured to, with the processor, cause the apparatus to process the received sensor data with the received application computer program code to generate application output data.

In some embodiments, the at least one memory and the computer program code may be configured to, with the processor, cause the apparatus to associate an identifier of the at least one sensor with the received application computer program code. The at least one memory and the computer program code may be configured to, with the processor, cause the apparatus to receive an indication of a replacement sensor to replace the at least one sensor, and, in response to the indication of the replacement sensor, disassociate the identifier of the at least one sensor from the received application computer program code and associate an identifier of the replacement sensor with the received application computer program code.

In some embodiments, the at least one memory and the computer program code are configured to determine an error relating to the receipt of sensor data from the at least one sensor, and in response to determining the error, generate the indication of the replacement sensor based on a type of the object.

In some embodiments, the at least one memory and the computer program code are configured to receive the compatible application information from the remote computing device and cause the compatible application information to be provided via a user device, wherein the application computer program code is received from the remote computing device based on a user selection.

In some embodiments, generating the application output data comprises transforming the application output data to a specified format associated with a remote computing device, wherein the remote computing device is configured to receive transformed application output data in the specified format, wherein the application output data is generated from sensor data originating from a plurality of sensors having a plurality of different respectively associated types of objects.

The at least one memory and the computer program code may be configured to generate a list of actionable policies based on the received application computer program code, and cause the list of actionable policies to be provided via a user interface, wherein the received sensor data is processed with the received application computer program code according to a user-selected actionable policy from the list of actionable policies.

In some embodiments, the at least one memory and the computer program code are configured to cause transmission of the application output data to a remote computing device, and in response to a request for analytics data related to the sensor data, cause a remote analytics device to (a) access the application output data on the remote computing device, (b) analyze the application output data to generate the analytics data, and (c) cause transmission of the analytics data to the apparatus. The analytics data may be provided via a user interface.

In some embodiments, the at least one memory and the computer program code are configured to receive biometric sensor data, and encrypt the biometric sensor data and cause transmission of the encrypted biometric sensor data to a remote authentication device. Prior to receiving a response from the remote authentication device indicating a user identifier associated with the biometric sensor data, the received sensor data may be cached. In response to receiving the response from the remote authentication device indicating the user identifier associated with the biometric sensor data, the apparatus may cause storage of the cached sensor data in association with the user identifier.

A method is also provided in accordance with an example embodiment in order to receive an indication of at least one sensor associated with an object, and, in response to receiving the indication of the at least one sensor, to determine application requirements associated with the at least one sensor. The method includes causing transmission of a request to a remote computing device for compatible application information based on the application requirements associated with the at least one sensor, and receiving application computer program code from the remote computing device based on at least the compatible application information. In some embodiments, the method includes receiving sensor data from the at least one sensor, and processing the received sensor data with the received application computer program code to generate application output data.

In some examples, the method may include associating an identifier of the at least one sensor with the received application computer program code and receiving an indication of a replacement sensor to replace the at least one sensor. The method also includes, in response to the indication of the replacement sensor, disassociating the identifier of the at least one sensor from the received application computer program code and associating an identifier of the replacement sensor with the received application computer program code.

The method may include determining an error relating to the receipt of sensor data from the at least one sensor, and in response to determining the error, generating the indication of the replacement sensor based on a type of the object. The method may also include receiving the compatible application information from the remote computing device, and causing the compatible application information to be provided via a user device, wherein the application computer program code is received from the remote computing device based on a user selection.

In some embodiments, the method includes receiving at least one sensor configuration parameter associated with the at least one sensor, wherein the sensor configuration parameter provides information regarding expected data to be received from the at least one sensor, and processing configuration computer program code to perform a data integrity test on at least one of the received sensor data or the application output data based on the at least one sensor configuration parameter.

In some embodiments, the method includes generating a list of actionable policies based on the received application computer program code, and causing the list of actionable policies to be provided via a user interface, wherein the received sensor data is processed with the received application computer program code according to a user-selected actionable policy from the list of actionable policies.

The method may include causing transmission of the application output data to a remote computing device, and, in response to a request for analytics data related to the sensor data, causing a remote analytics device to (a) access the application output data on the remote computing device, (b) analyze the application output data to generate the analytics data, and (c) cause transmission of the analytics data.

The method may include receiving biometric sensor data, and encrypting the biometric sensor data and causing transmission of the encrypted biometric sensor data to a remote authentication device. The method may include, prior to receiving a response from the remote authentication device indicating a user identifier associated with the biometric sensor data, causing the received sensor data from the at least one sensor to be cached. The method also includes, in response to receiving the response from the remote authentication device indicating the user identifier associated with the biometric sensor data, causing storage of the cached sensor data in association with the user identifier.

A computer program product is provided in accordance with an example embodiment which includes at least one non-transitory computer-readable storage medium having computer-executable program code instructions stored therein. The computer-executable program code instructions include program code instructions to receive an indication of at least one sensor associated with an object, and in response to receiving the indication of the at least one sensor, determine application requirements associated with the at least one sensor. The computer-executable program code instructions further include program code instructions to cause transmission of a request to a remote computing device for compatible application information based on the application requirements associated with the at least one sensor, and receive application computer program code from the remote computing device based on at least the compatible application information. The computer-executable program code instructions further include program code instructions to receive sensor data from the at least one sensor, and process the received sensor data with the received application computer program code to generate application output data.

An apparatus is also provided in accordance with an example embodiment which includes means for receiving an indication of at least one sensor associated with n object. The apparatus also includes means for, in response to receiving the indication of the at least one sensor, determining application requirements associated with the at least one sensor. The apparatus also includes means for causing transmission of a request to a remote computing device for compatible application information based on the application requirements associated with the at least one sensor and receiving application computer program code from the remote computing device based on at least the compatible application information. The apparatus also includes means for receiving sensor data from the at least one sensor, and processing the received sensor data with the received application computer program code to generate application output data.

BRIEF DESCRIPTION OF THE DRAWINGS

Figure 1:
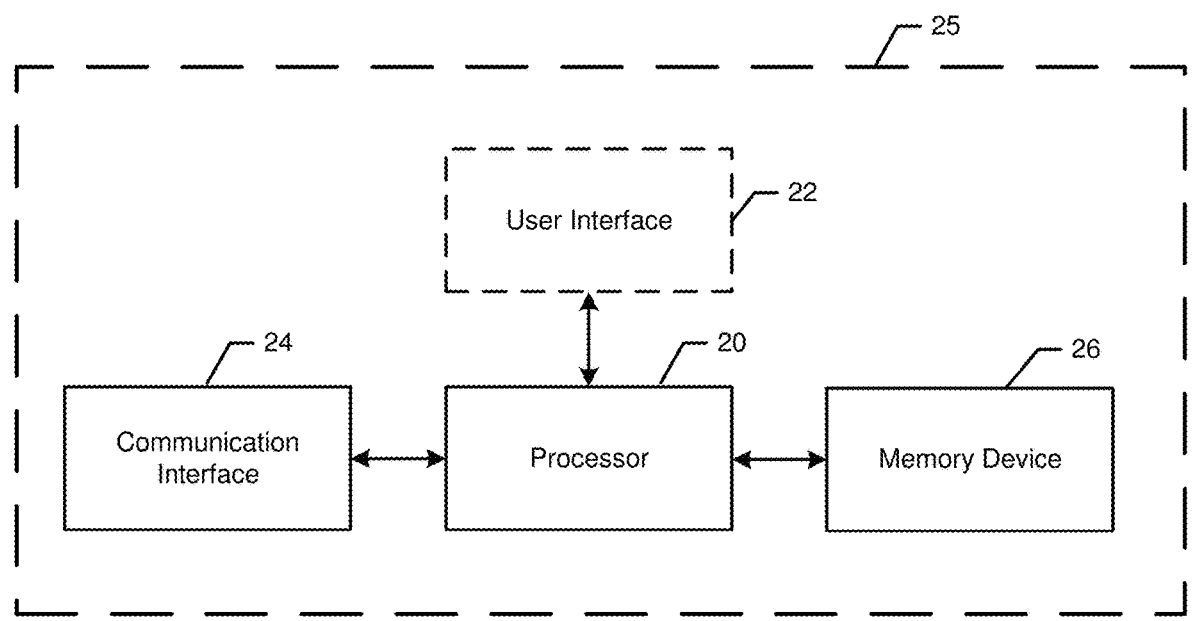
Figure 2A:
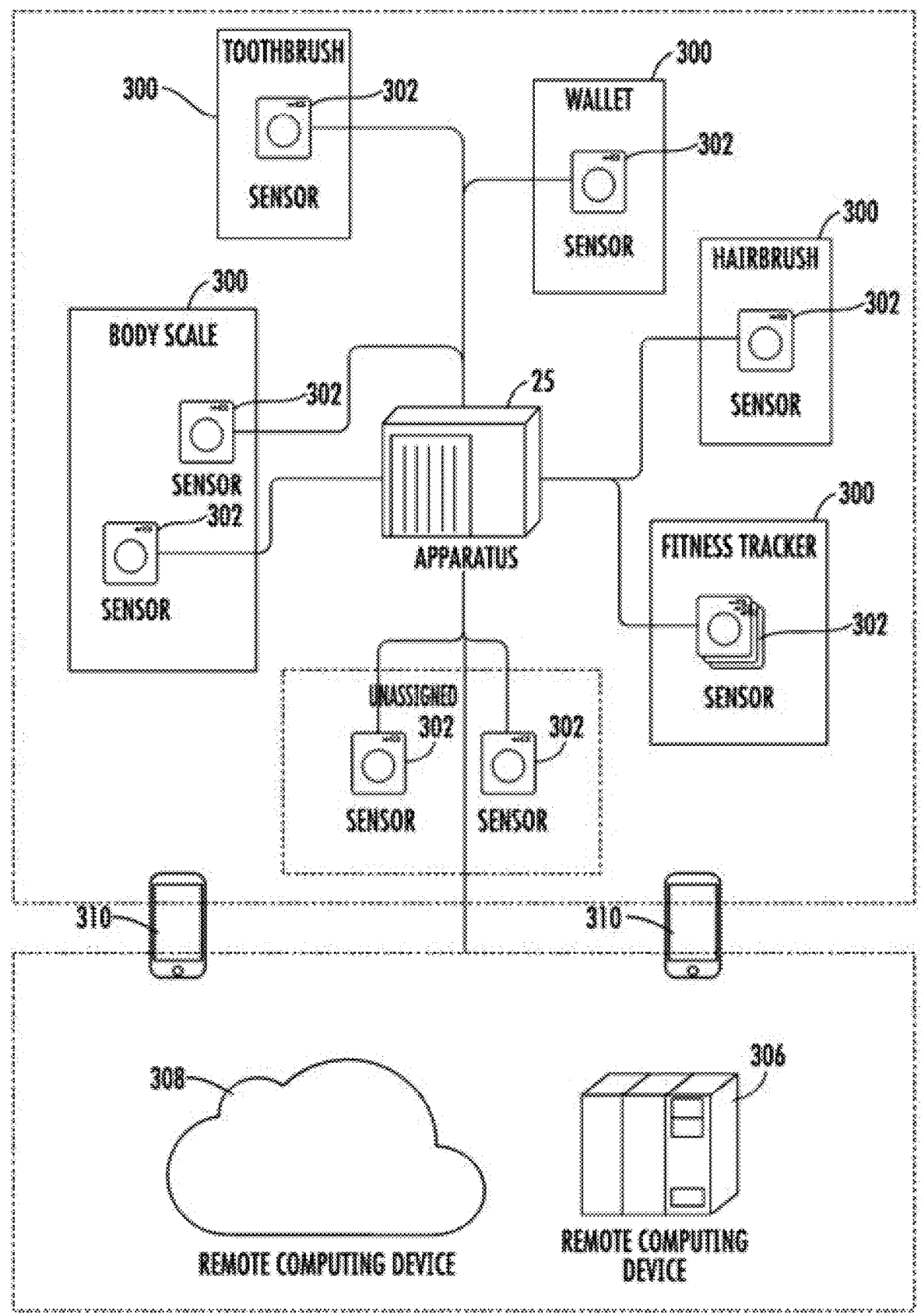
Figure 2C:
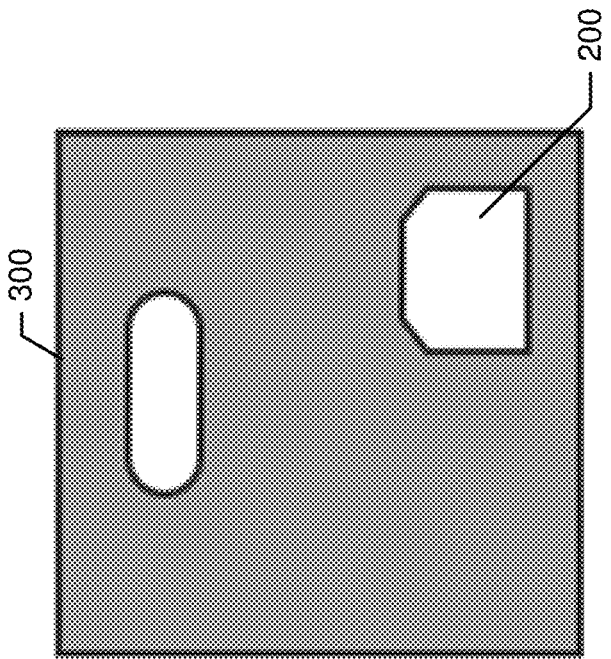
Figure 2B:
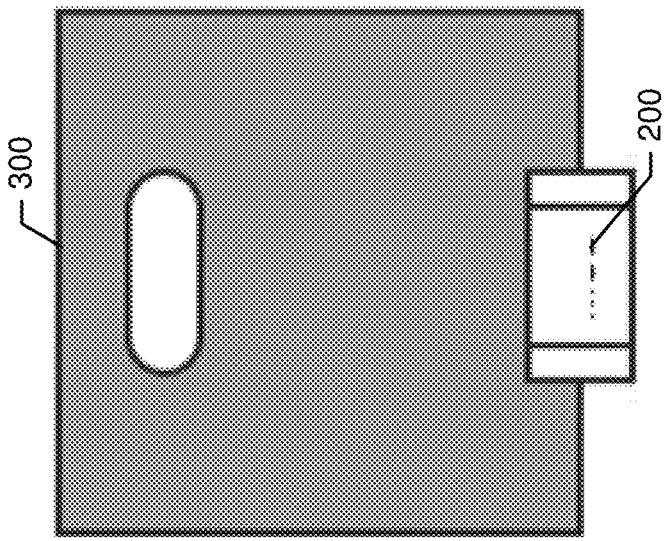
Figure 3A:
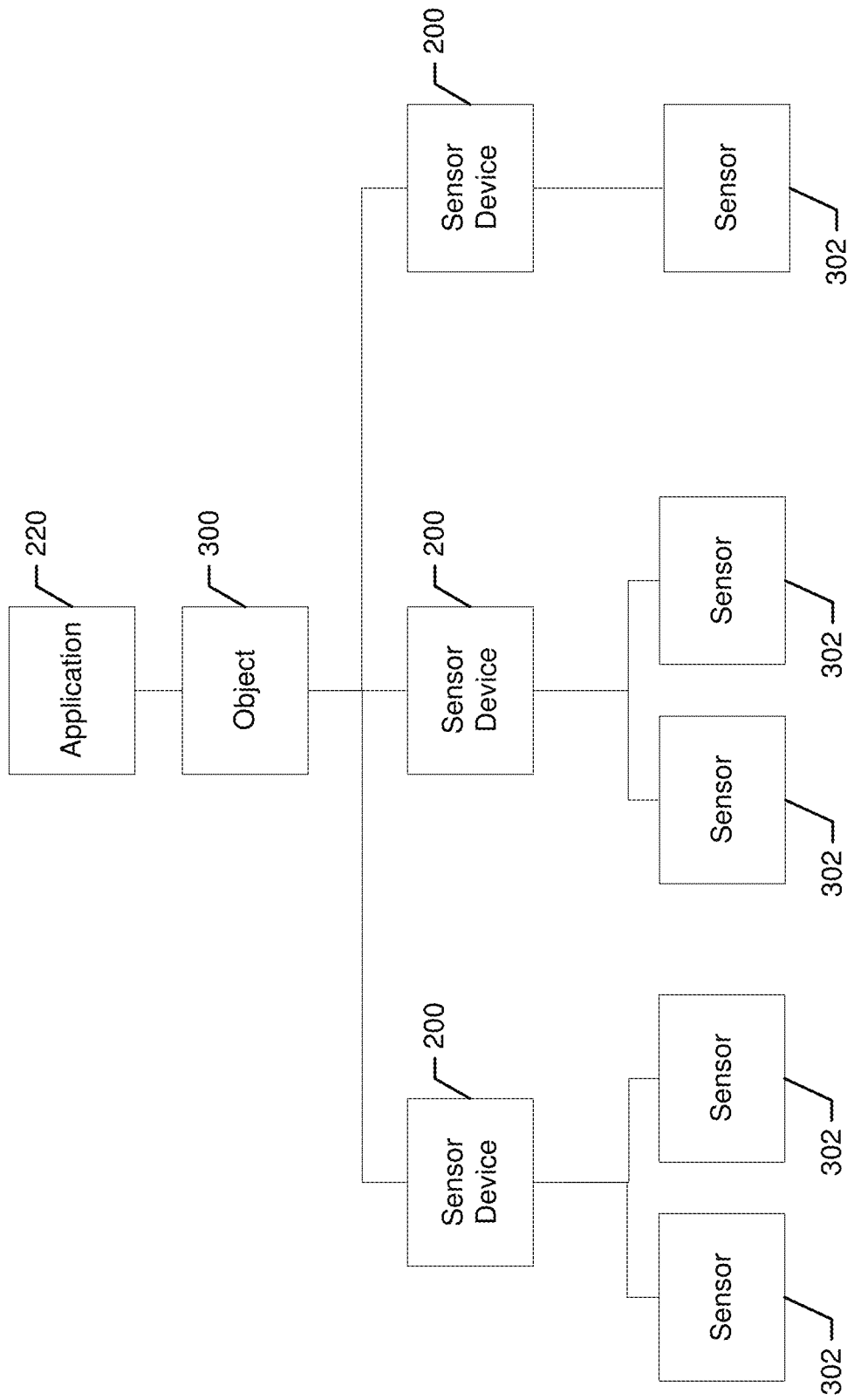

Having thus described certain example embodiments of the present disclosure in general terms, reference will hereinafter be made to the accompanying drawings which are not necessarily drawn to scale, and wherein:

FIG. 1 is a block diagram of an apparatus that may be configured to implement an example embodiment of the present disclosure;

FIG. 2A is a block diagram of a system that includes an example embodiment of the present disclosure;

FIGS. 2B and 2C illustrate example objects and sensor devices according to an example embodiment of the present disclosure;

FIG. 3A is a block diagram of components of a system according to an example embodiment of the present disclosure; and FIGS. 3B, 3C and 4-13 are flowcharts illustrating operations performed in accordance with an example embodiment of the present disclosure.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided for providing data collection via a plurality of sensors, user authentication, data storage, and automatic or manual sensor replacement and configuration processes.

Referring to FIG. 1, apparatus 25 may include or otherwise be in communication with a processor 20, communication interface 24, and memory device 26. As described below and as indicated by the dashed lines in FIG. 1, in some embodiments, the apparatus 25 may also optionally include a user interface 22.

In some embodiments, apparatus 25 may be implemented as any type of device and may comprise or may be in communication with any number of sensors, described in further detail hereinafter.

In some examples, apparatus 25 may be implemented as a server or distributed system for providing data collection via a plurality of sensors, user authentication, data storage, and automatic sensor replacement and configuration. In some examples, apparatus 25 need not necessarily be embodied by a server, and may be embodied by a wide variety of devices including personal computers, work stations, or mobile terminals, such as laptop computers, tablet computers, smartphones, wireless router, wireless access point, vehicle computer, or any combination of the aforementioned, and other types of voice and text communications systems. In some examples, apparatus 25 need can be embodied by a base transceiver station (BTS), a base station controller (BSC), a mobile edge computing (MEC) architecture, or any combination of the aforementioned, and other types of voice and text communications systems.

The apparatus 25 may, in some embodiments, be embodied in various devices as described above (e.g., server, work station, and/or the like). However, in some embodiments, the apparatus 25 may be embodied as a chip or chip set. In other words, the apparatus 25 may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present disclosure on a single chip or as a single "system on a chip." As such, in some cases, a chip or chipset may constitute means for performing one or more operations for providing the functionalities described herein.

Apparatus 25 may be implemented in a variety of devices and/or types of devices. The apparatus may be implemented as a wearable device, such as a wrist worn apparatus. In such an example, the apparatus 25 may include any number of sensors, such as those described in further detail hereinafter. In some examples, apparatus 25, even if implemented as a wearable device comprising sensors, may be configured to communicate with additional external sensors as described herein, enabling a user to access other remote devices and/or associated sensors while utilizing the apparatus 25.

In some embodiments, apparatus 25 may be implemented as a uni-centric home hub that provides a secure gatekeeper of data from various objects, sensors and/or sensor devices to a remote computing device(s) that may store and/or analyze the data received from sensors. For example, when apparatus 25 is implemented as a uni-centric home hub, the apparatus 25 may, in some examples, operate as or similarly to a wall-plug connected household device (e.g., a night light). Similar to a wearable embodiment, the apparatus 25 implemented as a uni-centric home hub may communicate with external sensors. In some examples, the uni-centric home hub may be configured to communicate with different types of sensors, and/or in some examples, may be configured to communicate with the same types of sensors associated with different users. For example, the uni-centric home hub may be configured to communicate with a heart rate sensor for a first user, a second heart rate sensor for a second user, and/or a body weight scale.

In some embodiments, apparatus 25 may be implemented as a modular home hub, such as a device having one or more functions in addition to the operations of an example embodiment. For example, a modular home hub embodiment may include or may be embodied by a wall-clock, alarm clock, or table lamp, for example. For example, apparatus 25 may be implemented based on a modular concept so that additional modules, sensor devices and/or sensors can be plugged into the device to extend the capabilities. In such an example, apparatus 25 may be operative within a central place in a home, and may be connected, such as by a wireline network, to pluggable devices such as but not limited to a pluggable motion sensor, pluggable microphone that may have speech recognition capability, a pluggable air quality sensor, a pluggable WiFi router and/or any other external sensors or devices.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present disclosure. For example, the memory device 26 could be configured to buffer input data for processing by the processor 20. Additionally or alternatively, the memory device 26 could be configured to store instructions for execution by the processor 20. In some embodiments, the memory device 26 may be configured to store application computer program code configured to process sensor data, for example, according to an example embodiment provided herein. For example, application computer program code may be stored in memory 26 in association with an identifier of a sensor from which sensor data may be received. The processor 20 may process the sensor data received from the identifier sensor, with the stored application computer program code.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present disclosure while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. For example, the processor 20 may process data received from a sensor application by executing associated application computer program code.

However, in some cases, the processor 20 may be a processor of a specific device (e.g., a mobile terminal or network entity) configured to employ an embodiment of the present disclosure by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. For example, communication interface 24 may be configured to facilitate communication between apparatus 25 and any number of sensors and/or remote devices, described in further detail hereinafter.

In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

In some embodiments, such as instances in which the apparatus 25 is embodied by a user device, the apparatus 25 may include a user interface 22 that may, in turn, be in communication with the processor 20 or to cause provision of an audible, visual, mechanical or other output to the user. As such, the user interface 22 may include, for example, a keyboard, a mouse, a joystick, a display, a touch screen(s), touch areas, soft keys, a microphone, a speaker, other input/output mechanisms, or any combination thereof. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

In general, FIG. 2A illustrates a system including an example embodiment of apparatus 25, in communication with objects 300, remote computing devices 306 and 308, and user devices 310, described in further detail hereinafter. Although remote computing devices 306 and 308 are depicted, it will be appreciated that any number of remote computing devices may be present in the system.

As illustrated in FIG. 2A, an object 300 may include one or more sensors 302. The object 300 may be any object such as a household appliance, device (e.g., electronic device), or human, animal, and/or the like. For example, object 300 may comprise or may be embodied by apparatus 25. However, it will be appreciated that object 300 may not comprise all the components described as being included in apparatus 25. Rather, object 300 may be considered any object comprising, associated, or attached with one or more sensors 302. A sensor 302 can be attached to an object 300 by glue, tape, screw, and/or mechanical means. In an example embodiment, the sensor 302 may not directly communicate with the object 300, but via the apparatus 25.

In some examples, a sensor 302 may be embodied in a sensor device or modular sensor device, which may comprise any number of sensors 302. The sensor device may further include other components such as a structural housing to incorporate sensors 302 into the sensor device which can be embedded in, attached to, or integrated with object 300. For example, FIGS. 2B and 2C illustrate two example objects 300 that are body weight scales. In FIG. 2B, the object 300 includes a sensor device 200 (which may be considered a modular sensor device 200) that is attached, and in some examples, removably attached, to object 300. In this regard, a user may easily remove the sensor device 200 without opening or dismantling the object 300. In FIG. 2C, the object 300 includes a sensor device 200 that is built-in to or integrated with object 300.

The sensor devices 200 may include any number of sensors 302. In some examples, sensor device 200 may include any of the components described with respect to apparatus 25, and may be configured to store sensor data detected by any of the sensors 302, and/or transmit the sensor data to the apparatus 25. For example, the sensor device 200 may include a memory device, such as memory device 26, and/or a communication interface, such as communication interface 24.

Any reference to multiple sensors 302 made herein may therefore refer to sensors 302 implemented separately from each other, or within the same sensor device 200. In this regard, a sensor device 200 may be designed to be compatible with a specific type of object 300. In some examples, a sensor device 200 may not be present, and any number of sensors 302 may be embedded in, attached to, or integrated with object 300. Any reference to one or more sensors 302, may be considered as implemented in a sensor device 200, in multiple sensor devices 200, and/or separately such that the sensors 302 may be individually attached to, embedded in, or integrated with object 300.

In an instance or example in which one or more sensors 302 are implemented within a sensor device 200, the sensor 302 may not include a communication interface compatible with apparatus 25, and/or may not include a memory device, but may be configured to cause storage of sensor data on a memory device of the sensor device 200. The sensor device 200 may be configured to access and cause transmittal of the sensor data, such as to apparatus 25.

In this regard, sensor device 200 may include a communication interface, such as communication interface 24, or any interface configured to collect data from one or more sensors 302. The sensor device 200 may be further configured to digitize the data. The data packets may then be transmitted by the communication interface of the sensor device 200 at the highest sampling rate among all sensors 302, to apparatus 25.

In some examples, the sensors 302 and/or sensor device 200 may transmit or emit "isAlive" signals to the apparatus 25, such as periodically or on a predetermined schedule. In this regard, apparatus 25 may receive a signal from the sensors 302 and/or sensor device 200, and determine that sensor data may be received from sensors 302 and/or sensor device 200. Data may be transmitted to apparatus 25 periodically, on a routine basis, and/or as it is detected by sensors 302 and/or stored on sensor device 200.

A sensor 302 according to example embodiments may comprise any type of sensing and/or detection device including but not limited to, a motion sensor, a radar detection device, a hygrometer, a camera, a microphone, a motion detector, a radar detection device, a radio, an accelerometer, a galvanized skin sensor, a heart rate sensor, a physiological sensor, a biological sensor, a neurological sensor, a temperature sensor, a location detection sensor, and/or any other environmental condition sensors. The sensors 302 may be configured to detect data and signals from the surrounding environment, the object 300 and/or user. In some examples, a sensor 302 may be configured to detect a specific type of data or is configured to attach to or to be integrated with a specific type of device, such as object 300. In some examples, sensor device 200 may be configured to be attach to or to be integrated with a specific type of device. In this regard, the sensor device 200 may be referred to as a modular sensor device, and/or the sensors 302 may be considered modular sensors.

For example, as illustrated in FIG. 2A, an object 300, such as a body scale device may include two sensors 302 such as a weight sensor configured for weighing a user or other object, and an air quality sensor for measuring the air quality in the environment. As another example, the objects 300 may include a toothbrush, wallet, hairbrush, and/or fitness tracker, each of which may include any number of sensors 302 or sensor devices 200. In some examples, sensors 302 may be unassigned to an object 300, or not associated with an object 300. In such an example, a sensor 302 may be used independently of an object 300. In some embodiments, a sensor 302 may be configured to be installed in, attached to, and/or subsequently associated with an object 300, as described in further detail hereinafter. In one example, the toothbrush 300 maybe be assigned or attached to a motion sensor, a saliva analysis sensor, a pressure sensor, and/or an authentication sensor (such as a finger print detection sensor). In one example, the wallet 300 maybe be assigned or attached to a motion sensor, a pressure sensor, temperature sensor, and/or an authentication sensor (such as a finger print detection sensor).

Additional examples of objects 300 not illustrated in FIG. 2A may include but are not limited to a heart rate detection device, sleep pad sensor device, hairbrush sensor, vacuum sensor, and/or shoe sensor. Any of the aforementioned devices may comprise any number or combination of sensors 302.

FIG. 3A is a block diagram of components of a system according to an example embodiment of the present disclosure. FIG. 3A may be considered a hierarchical diagram. Application 220 may include application computer program code, described in further detail hereinafter. An application 220 may be associated with an object 300, which may include or may be associated with any number of sensor devices 200. Each sensor device 200 may include any number of sensors 302. In this regard, the application 220 may be configured to receive sensor data detected by any of the sensors 302, via a sensor device 200. With the application 220, the application context may be determined based on sensor data detected from sensors 302 and/or sensor device 200. The application 220 may be initially retrieved from a remote computing device, and may be installed on apparatus 25. Apparatus 25 may process the sensor data with the application 220, accordingly. Further, application 220 may direct the apparatus 25 to configure any of the sensors 302 and/or sensor device 200. In this regard, sensor data requested by the application 220 may be transmitted to apparatus 25.

Figure 3B:
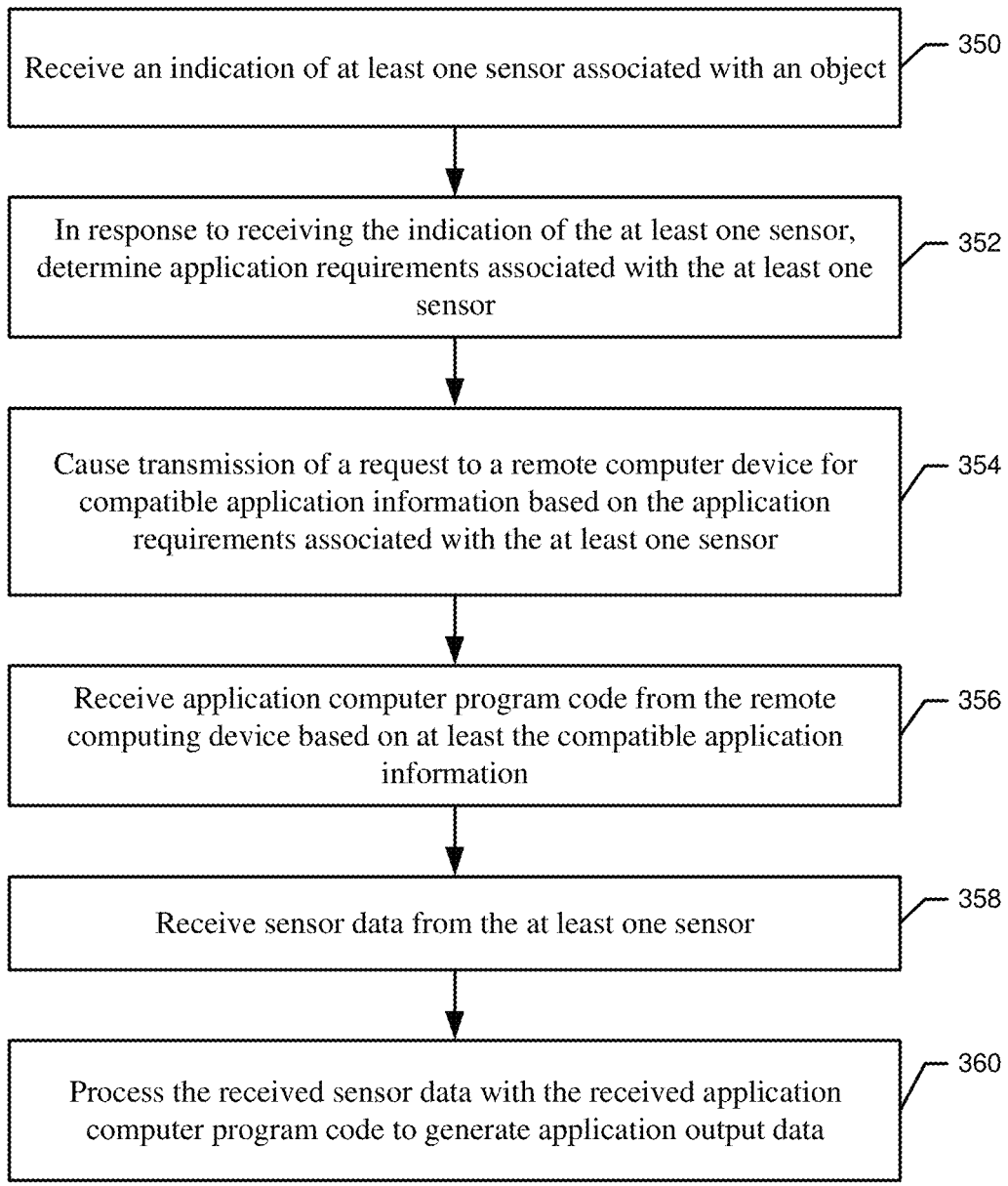

FIG. 3B is a flowchart of operations performed by apparatus 25 according to an example embodiment. As shown by operation 350, apparatus 25 may include means, such as the processor 20, user interface 22, communication interface 24, and/or the like, for receiving an indication of at least one sensor, such as sensor 302, associated with an object, such as object 300. The apparatus 25 may receive indications of any number of sensors, each of which may be associated with an object such as the example objects 300 depicted in FIG. 2A.

According to operation 350, the apparatus 25, such as with a processor 20, a communication interface 24, and/or the like, may receive the indication of sensor 302 by a variety of methods. For example, the apparatus 25 may receive an indication of the sensor 302 over the communication interface 24, such as by near field communication (NFC), for example radio-frequency identification (RFID), via a local area network, for example ZigBee, Z-Wave, Wi-Fi, ultra-wideband (UWB), wireless LAN (wireless local area network), Blutooth™, or via a wide-area network, for example Long Range Wide Area Network (LoRaWAN), LTE Advanced for Machine Type Communications (LTE-MTC), NarrowBand IoT (NB-IoT), enhanced Machine Type Communications (eMTC), mobile telecommunication data, or any combination thereof, and other types of wireless communications systems. In some embodiments, the apparatus 25, such as with the processor 20, the communication interface 24 and/or the like, may transmit a signal to search for sensors 302. A sensor 302 may emit a signal that is detected by the apparatus 25 such that a response or return signal is transmitted to the apparatus 25 and the indication of the sensor 302 is received by the apparatus. Accordingly, in some examples, a signal emitted by the sensor 302 may be transmitted in response to the signal transmitted by apparatus 25, or in some examples, a signal emitted by the sensor 302 may be transmitted independently of any signal transmitted by apparatus 25. Accordingly, the indication of the sensor may be received by apparatus 25 in an instance the sensor 302 comes within a threshold range of the apparatus 25 or within a detectable range by apparatus 25. Said differently, the apparatus 25 may receive an indication of a sensor 302, sensor device 300, and/or the like when the sensor or device comes in close proximity, within a threshold proximity, or within a detectable proximity of apparatus 25. In some example embodiments, apparatus 25, such as the processor 20 and/or communication interface 24, may receive the indication of a sensor by accessing a network to determine if any sensors 302 are communicating with the network.

In some embodiments, apparatus 25 may receive the indication of a sensor in response to a user configuration (e.g., via a user interface 22) performed via the apparatus 25 and/or an object 300 associated with the sensor 302. In some examples, a user may provide input to configure a sensor 302 to communicate with apparatus 25, with a user device 310. In this regard, apparatus 25 may include a means or mechanism for linking a sensor 302 to the apparatus 25.

User device 310 may include any type of user device, such as devices including personal computers, work stations, or mobile communication terminals, such as laptop computers, tablet computers, smartphones, vehicle computers, electronic watches, electronic fitness devices, navigation device, location detecting devices, or any combination of the aforementioned, and other types of voice and text communications systems. In some examples, the user device 310 may be implemented as apparatus 25 and may therefore include any of the components described with respect to apparatus 25. The user device 310 may be configured to communicate with apparatus 25, and any of the remote computing devices 306 and/or 308.

For example, a user may be prompted to confirm connectivity and/or configuration of an object 300 and/or associated sensor 302 to communicate with apparatus 25, when using the object 300 and/or associated sensor(s) 302 for the first time, for example. As another example, a user may be prompted or alerted, such as via user interface 22 and/or user device 310, to approve or disapprove connection of an object 300 and/or associated sensor 302 to apparatus 25 in response to detection of the apparatus 25 by an object 300 and/or sensor 302, and/or in response to detection of the object 300 and/or sensor 302 by the apparatus 25. In some examples, association of object 300, sensor 302, and/or sensor device 200 with apparatus 25 may occur in response to the object 300, sensor 302, and/or sensor device 200 coming within a threshold proximity of, or detectable proximity of apparatus 25.

As shown in FIG. 3B, operation 352, apparatus 25 may include means, such as the processor 20, user interface 22, communication interface 24, memory device 26, or the like, for, in response to receiving the indication of the at least one sensor, determining application requirements associated with the at least one sensor. In some examples, operation 352 may be considered optional. In some examples, the application requirements may include identifying information of a remote computing device on which to access application computer program code associated with the sensor 302. For example, the application requirements may include a uniform resource location (URL) or network address by which to access application computer program code associated with a sensor 302. In some examples, the application requirements may include data or information identifying the object 300 associated with the sensor 302. For example, the application requirements may identify a device type of object 300 associated with sensor 302. As another example, the application requirements may include authorization or authentication information to enable access to the application computer program code associated with the sensor 302.

In some examples, the application requirements may be included in a signal transmitted from the at least one sensor 302 to the apparatus 25. In some examples, a user may provide application requirements to apparatus 25 such as with user interface 22 and/or user device 310. As another example, a signal transmitted from the at least one sensor 302 to apparatus 25 may include a serial number or other identifying information of the sensor 302 and/or object 300 such that apparatus 25, with processor 20, may request the application requirements from a remote computing device, such as remote computing device 306 depicted in FIG. 2A.

The remote computing device 306 may be embodied by an apparatus, such as apparatus 25. In some examples, the remote computing device 306 may be implemented as a server, such as an application server, configured to host application computer programming code. In this regard, remote computing device 306 may be referred to as an "application store," or "app store." In some examples, the remote computing device 306 may be configured as a distributed system in a network.

As shown by operation 354, apparatus 25 may comprise means, such as the processor 20, communication interface 24, memory device 26, or the like, for causing transmission of a request to a remote computing device for compatible application information based on the application requirements associated with the at least one sensor. In this regard, apparatus 25, with processor 20, may cause transmission of the request to remote computing device 306. The request may include the application requirements, such as application requirements associated with the sensor 302 and/or associated object 300, or any identifying information of a device type of object 300, sensor type of sensor 302, and/or the like. The request for the compatible application information may include a request for identifying information of all or some application computer program code packages or bundles such that the deployed application program code is configured or configurable to process sensor data received from the at least one sensors 302.

In this regard, the remote computing device 306 may, in response to a request for the compatible application information, transmit compatible application information to apparatus 25, which may be displayed by a user device, such as any object 300, user device 310, and/or via the user interface 22, for example. According to some embodiments, a user may select desired application information from the compatible application information. The selected desired compatible application information may indicate how sensor data received from a sensor 302 will be processed, stored, and/or transmitted to other devices. In some examples, a user may select compatible application information from multiple options provided on the user interface, and the application computer program code corresponding to the selection may be received from the remote computing device 306 accordingly, and stored on memory device 26.

Continuing to operation 356, the apparatus 25 may include means, such as the processor 20, communication interface 24, memory device 26, and/or the like, for receiving application computer program code from the remote computer device 306 based on at least the compatible application information. In some examples, the application computer program code may be downloaded from or installed from the remote computing device 306 onto the apparatus 25, such as via communication interface 24. The application computer program code may be stored on memory device 26 in association with one or more identifiers of sensor(s) 302. The apparatus 25 may therefore associate an identifier of a sensor with the received application computer program code. As another example, the application computer program code may be identified based on a user selection from the compatible application information, for example.

In operation 358, apparatus 25 may include means, such as processor 20, communication interface 24, and/or the like, for receiving sensor data from the at least one sensor, such as sensor 302. According to an example embodiment, the sensor data may include any data detected by the sensor 302. The received sensor data may be considered raw data, as it may not have been processed by the apparatus 25, and may be in a format as provided by the sensor 302. In this regard, any reference made to raw data or sensor data may indicate that the data is in a format as received from the sensor 302.

In some examples, the sensor data may be transmitted to the apparatus 25 via a network, such as on a daily basis and/or at a predefined scheduled time, and/or in response to an explicit request by a user, the device 310 or the devices 306 or 308. In some examples, the sensor data may be received on the apparatus 25 when the associated object 300 and/or sensor 302 comes within a threshold range of the apparatus 25, such as within a threshold range so as to enable near field communication between the sensor 302 (and/or object 300) and apparatus 25.

The sensor data may be transferred according to any of a variety of data transfer protocols. For example, the sensor data may be transferred with any of Internet of Things (IoT), protocols such as WiFi, ZigBee, Z-Wave, and/or Bluetooth™ communication. In some examples, a proprietary data transfer protocol may be used.

In an example embodiment, apparatus 25 may receive sensor data from sensor 302 in response to connecting to a network, such as a local area network, to which the sensor 302 is connected. As another example, apparatus 25 may receive sensor data from sensor 302 after the sensor 302 connects to a network, such as a local area network to which apparatus 25 is connected.

In some embodiments, the apparatus 25 may receive the sensor data in response to a user input, such as a user input provided vian object 300 and/or user interface 22. In some examples, the user input may indicate to cause transmission of sensor data from the sensor 302 to the apparatus 25. In some examples, the user input may include user credentials, such as a user identifier and password, and the sensor data may be transmitted to the apparatus 25 responsive to the provision of the user credentials.

In some embodiments, the user input may be provided by a device that is remote from any of the objects 300 and/or apparatus 25. For example, user input may be provided via any user devices 310.

As another example, sensor data may be received by the apparatus 25 from a remote computing device, such as remote computing device 306, or a separate remote computing device, such as remote computing device 308 depicted in FIG. 2A. For example, the remote computing device 308 may be a cloud computing device, server, or other storage device accessible by apparatus 25 via a network. In this regard, the remote computing device 308 may provide sensor data, such as sensor data provided to the remote computing device 308 by a sensor 302, and/or sensor data transmitted to the remote computing device 308 by apparatus 25. For example, sensor data provided by the remote computing device 308 may include sensor data previously transmitted from the apparatus 25 to the remote computing device 308, such as for purposes of remote storage or backup storage. The sensor data received from the remote computing device 308 may therefore comprise historical sensor data. In some embodiments, the sensor data may be received by apparatus 25 from any of a sensor 302, and/or any number of remote computing devices 308.

As shown by operation 360, apparatus 25 may include means, such as the processor 20, communication interface 24, memory device 26, or the like, for processing the received sensor data with the received application computer program code to generate application output data. Apparatus 25, such as with processor 20, may process the sensor data according to the stored application computer program code associated with the sensor 302. For example, apparatus 25 may execute the application computer program code, such as the application computer program code received in operation 356, and/or stored on memory device 26. The application computer program code may perform various operations, such as with processor 20, on the sensor data, to generate application output data.

The application output data generated by processing the one or more sensor data may include an application context, which may indicate a type of object 300 to which the one or more sensors 302 are associated, and/or a type of sensor data. For example, the application context determined by analyzing the one or more sensor data may indicate that the one or more sensors 302 is associated with a mobile device, toothbrush sensor, garage opener, and/or any other type of device, and/or a user authentication.

In some embodiments, the generated application output data may be displayed on a user interface 22, such as that of apparatus 25, objects 300, and/or user devices 310, for example. For example, the application output data may contain measures and metrics based on the sensor data, policies determined based on the measures and metrics, as well as any statistical summaries of the measures, metrics and policies. The application output data may comprise information relating to lifestyle changes, personal health and/or fitness tracking, device usage, household appliance usage, environmental characteristics such as air quality, and/or the like.

In some examples, the application output data may comprise alerts. An alert may be provided by apparatus 25 and via user interface 22 and/or user device 310, such as in response to processing the sensor data and determining a calculation performed by the application computer program code exceeds, falls below, or satisfies a threshold amount, for example. As an example, the apparatus 25 may be configured to alert a user when their level of physical activity falls below a calculated threshold level, such as a predefined number of hours per week. As another example, apparatus 25 may provide application output data to users regarding changes in lifestyle or changes in other patterns of sensor data.

Figure 3C:
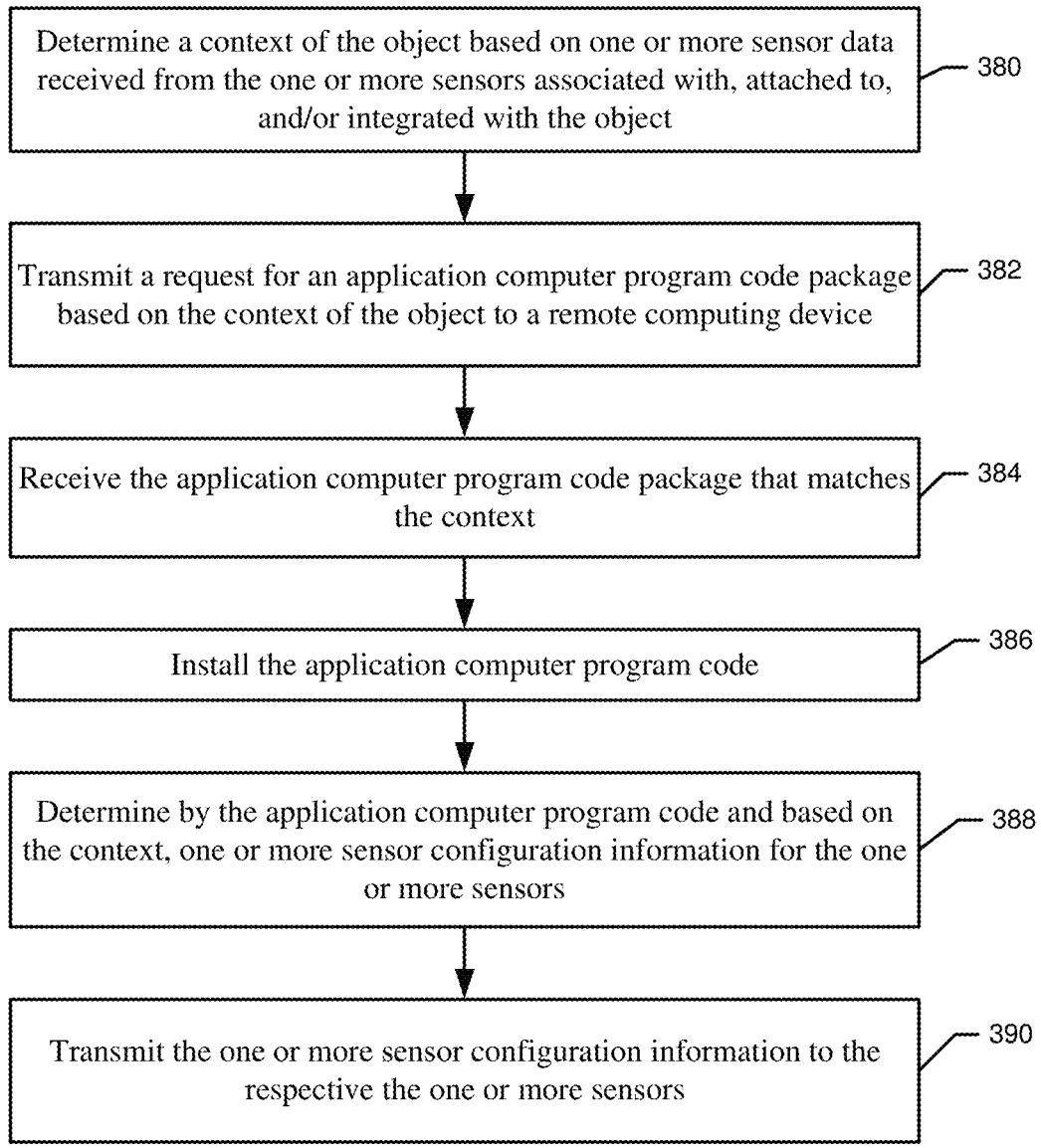

FIG. 3C is a flowchart of operations performed by apparatus 25 according to example embodiments. As shown by operation 380, the apparatus 25 may include means, such as the processor 20, user interface 22, communication interface 24, and/or the like, for determining (e.g., automatically) a context of the object 300 based on one or more sensor data received from the one or more sensors 302 associated with, attached to, and/or integrated with the object 300. For example, apparatus 25, such as with processor 20, may determine the context by analyzing the one or more sensor data. For example, apparatus 25 may receive a first sensor data that is movement data, a second sensor data that is pressure data, and third sensor data that is temperature data. The apparatus 25, such as with processor 20, may analyze the sensor data, and determine the context of the object 300 is a wallet.

As shown by operation 382, the apparatus 25 may include means, such as the processor 20, user interface 22, communication interface 24, and/or the like, for transmitting a request for an application computer program code package (e.g., a software application) based on the context of the object 300 to a remote computing device, such as remote computing device 306.

In operation 384, the apparatus 25 may include means, such as the processor 20, user interface 22, communication interface 24, and/or the like, for receiving the application computer program code package that matches the context.

In operation 386, the apparatus 25 may include means, such as the processor 20, user interface 22, communication interface 24, and/or the like, for installing the application computer program code package in the apparatus 25.

In operation 388, the apparatus 25 may include means, such as the processor 20, user interface 22, communication interface 24, and/or the like, for determining, by the application computer program code and based on the context, one or more sensor configuration information for the one or more sensors 302.

In operation 390, the apparatus 25 may include means, such as the processor 20, user interface 22, communication interface 24, and/or the like, for transmitting the one or more sensor configuration information to the respective one or more sensors 302. The sensor configuration information may include sensor sensing periods, and/or sensor upload periods. For examples, the sensor sensing periods may include a day and/or time range in which data is detected by the sensor 302. The sensor data upload periods may include an upload start time and/or day.

FIGS. 4-13 are additional example flowcharts of operations that may be performed according to example embodiments. In some of the flowcharts provided herein, some operations are performed by devices or systems implemented remotely from apparatus 25. However, it will be appreciated that in some examples, the apparatus 25 may cause any of the operations to be performed, even if on a remotely implemented device, such as with communication interface 24. In some examples, a signal or data is illustrated as being transmitted from a sensor 302 to apparatus 25. In some examples, it will be appreciated that the signal or data illustrated as being transmitted from sensor 302 to apparatus 25 may be generated by the apparatus 25, such as by computer program code operative on apparatus 25, and such as in response to receiving sensor data from sensor 302. Therefore, some operations depicted as being performed by sensor 302 (and/or any other components of the flowcharts) may indeed be performed by apparatus 25.

Figure 4:
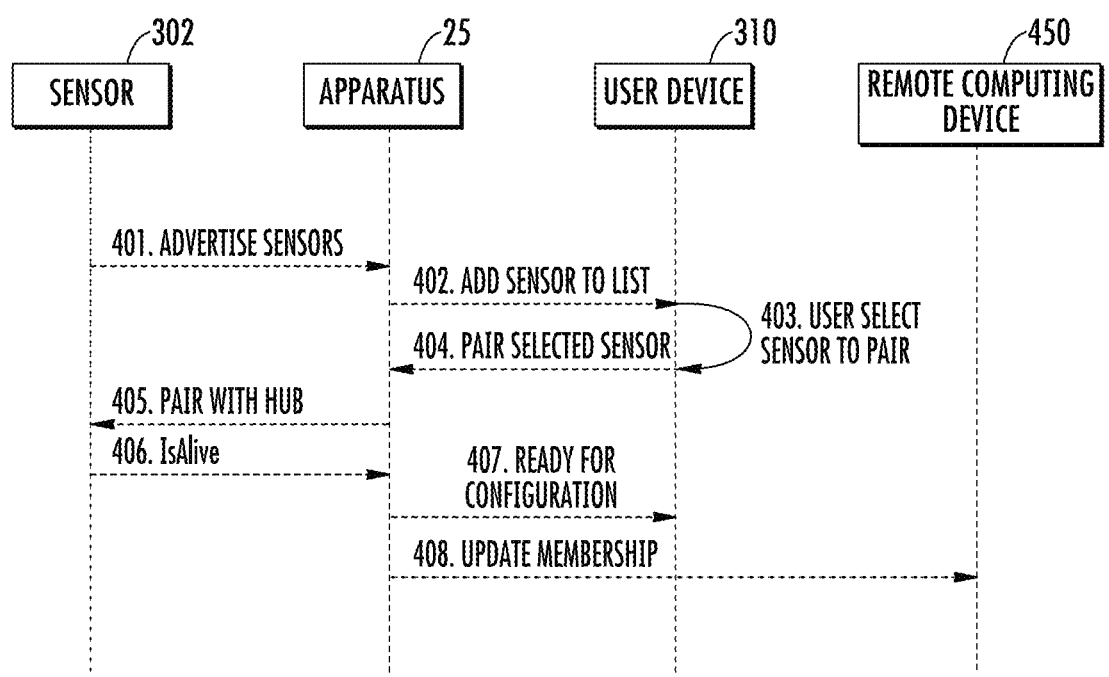

FIG. 4 is a flowchart of operations that may be performed according to an example embodiment to illustrated pairing of a sensor 302 with apparatus 25, so as to enable transmittal of data between the sensor 302 and apparatus 25.

In operation 401, the sensor 302 (and/or associated object 300) may advertise and/or emit a signal such that the apparatus 25 detects or receives an indication of the sensor, such as the processor 20, communication interface 24 and/or the like. In operation 402, apparatus 25 may include means, such as processor 20, memory device 26, user interface 22, and/or the like, for adding the sensor 302 to a list of sensors. The list of sensors may be stored on memory device 26, for example, and may include a list of identifying information of the sensors from which apparatus 25 may be configured to receive data. According to an example embodiment, apparatus 25 may cause a list to be transmitted to the user device 310 and provided via a user interface 22 and/or user device 310. The user may therefore select a sensor to pair (operation 403) with apparatus 25.

In operation 404, the apparatus 25 may include means, such as processor 20, communication interface 24 and/or the like, for receiving an indication of the selected sensor 302, and pairing the selected sensor 302 with apparatus 25. This may include storing an indicator in memory device 26 in association with an indicator of sensor 302, and configuring the apparatus 25 to receive sensor data from the sensor 302.

In some examples, as shown in operation 405, apparatus 25 may include means, such as processor 20, communication interface 24 and/or the like, for causing transmittal of a signal to the sensor 302 that the sensor 302 is paired with the apparatus 25. In operation 406, the apparatus 25 may include means, such as processor 20, communication interface 24 and/or the like, for receiving a signal from the sensor 302 that the sensor "isAlive," or active (e.g., ready to transmit data to apparatus 25). The apparatus 25, in operation 407, may include means, such as processor 20, communication interface 24 and/or the like, for transmitting an indication to the user device 310 that the sensor 302 is ready to be configured by apparatus 25. In some examples, the user may confirm, such as by user input provided via the user device 310, that the sensor 302 is to be configured.

In operation 408, the apparatus 25 may include means, such as processor 20, communication interface 24 and/or the like, for transmitting a request to a remote computing device 450, to update membership or user profile information such that the sensor 302 is registered with apparatus 25. In this regard, membership or a membership list may indicate sensors 302 associated with apparatus 25, and may further indicate a user identity associated with the sensor 302. In some examples, user information may be transmitted by apparatus 25 to the remote computing device 450.

The remote computing device 450 may be implemented on remote computing device 306 and/or 308 for example, and may be configured to provide user profile services and/or authentication services to apparatus 25. In this regard, remote computing device 450 may be considered a remote user profile device and/or remote authentication device. According to some embodiments, the remote computing device 450 may be embodied by an apparatus, such as apparatus 25. In some examples, the remote computing device 450 may be implemented as a server, such as an application server, configured to host computer programming code including user profile services. In some examples, the remote computing device 450 may be configured as a distributed system in a network.

Figure 5:
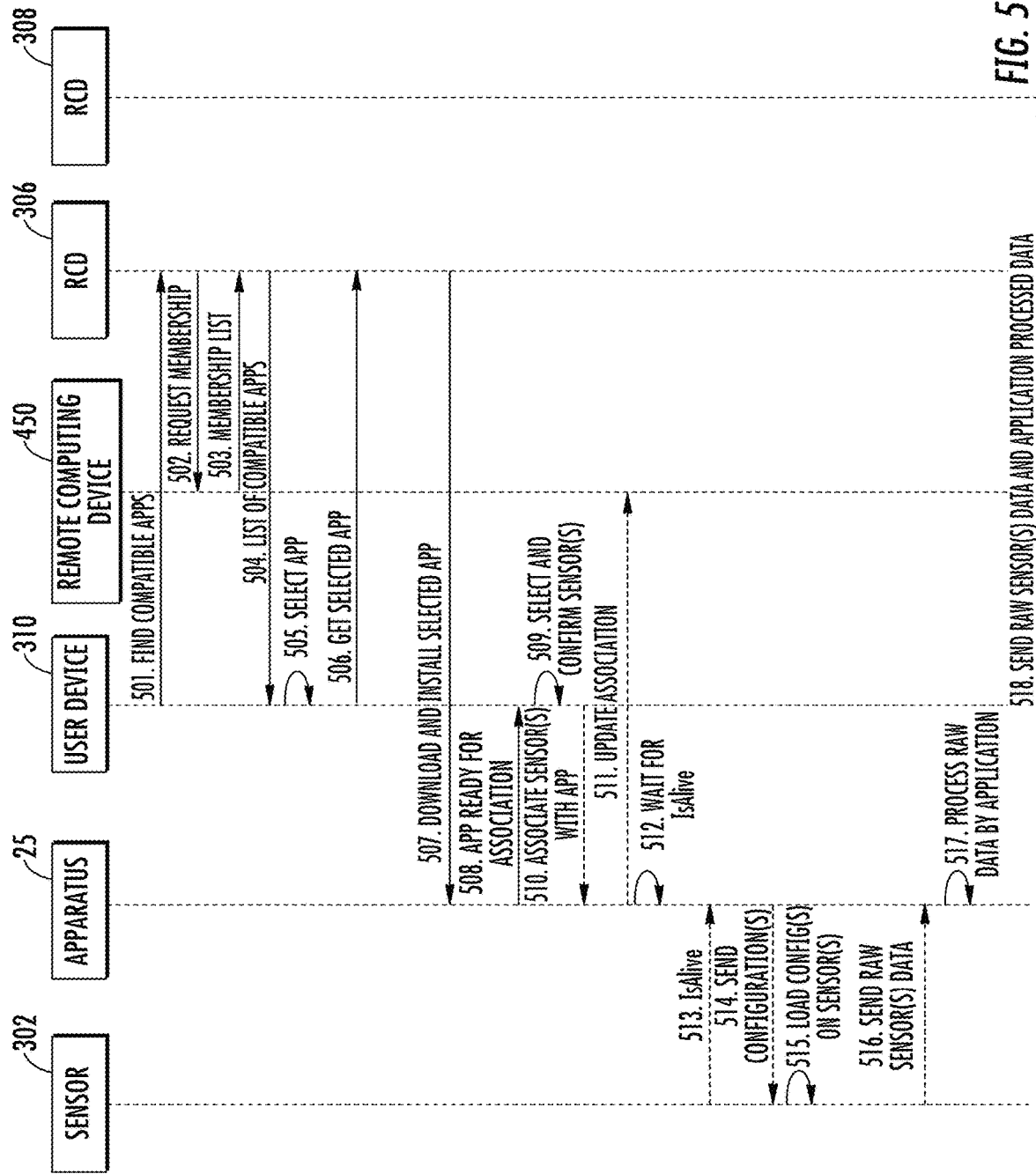

FIG. 5 is a flowchart of operations that may be performed according to an example embodiment, to use membership information to find compatible computer application program code via a remote computing device, such as in an "app store," for example. In this regard, compatible application computer program code may include applications, or "apps," which may process sensor data received from one or more sensors 302. In some examples, a user may make a selection of the application computer program code to be downloaded to apparatus 25. In some examples, the user may select the one or more sensors 302 which may have been paired with apparatus 25, but are not yet providing an application context. In response to the user confirming the selection, apparatus 25 may configure the one or more selected sensors 302, and the application life cycle may begin.

As depicted in further detail, in operation 501, the remote computing device 306 may receive a request from the user device 310 to find one or more compatible applications. Alternatively, the apparatus 25 may receive a request via the user device 310 to find compatible applications, and may directly access the remote computing device 306 accordingly. The request is at least a trigger mechanism from the user to find compatible applications for available sensors 302. The remote computing device 306 may, at operation 502, request membership of the sensors 302 to determine available sensors by accessing remote computing device 450. At operation 504, a list of compatible applications may be provided on the user device 310. In operation 505, a user may make an application selection, such that at operation 506, the selected application computer program code is requested from the remote computing device 306. In operation 507, the selected application computer program code is downloaded to the apparatus 25 and further installed in the apparatus 25. In operation 508, the apparatus 25 transmits to the user device 310 a message that indicates the application is ready for association. In operation 509, the user confirms and/or selects the one or more sensors 302.

In operation 510, the one or more sensors 302 are associated with the application computer program product code. In operation 511, the apparatus 25 requests the remote computing device 450 to update the associated application computer program code with the user profile information.

In operations 512 and 513, the apparatus waits for and receives an "isAlive" signal from sensor 302. In operations 514 and 515, one or more configurations of the one or more sensors may be transmitted to and loaded onto the one or more sensors 302. In operation 516, the apparatus 25 may include means, such as the processor 20, communication interface 24, and/or the like, for receiving sensor data from sensor 302. In this regard, any reference made herein to raw data, raw sensor data and/or sensor data may indicate that the data is in a format as received from the sensor 302, and in some examples, may not have been processed by apparatus 25. In operation 517, apparatus 25 may include means, such as processor 20, memory device 26, and/or the like, for processing the raw data with the application computer program product code. In operation 518, the apparatus 25 may include means, such as processor 20, communication interface 24, and/or the like, for transmitting raw data and/or application output data to a remote computing device 308, such as a remote storage device. Alternatively, the apparatus 25 can transmit the raw data and/or application output data to the user device 310 and/or the remote computing device 450.

In this regard, apparatus 25 may include means, such as processor 20, memory device 26, and/or the like, for transforming the raw data and/or application output data to a specified format associated with a remote computing device 308. In some examples, the remote computing device is configured to receive the transformed raw and/or application output data in the specified format. The raw and/or application output data may be generated from one or more sensor data originating from a one or more sensors having one or more different respectively associated types of devices. In some examples, the raw and/or application output data that is configured to be compatible with the remote computing device 308 may be generated from sensor data received from various sensors, and may be generated according to apparatus 25, and/or other devices external to apparatus 25.

Figure 6:
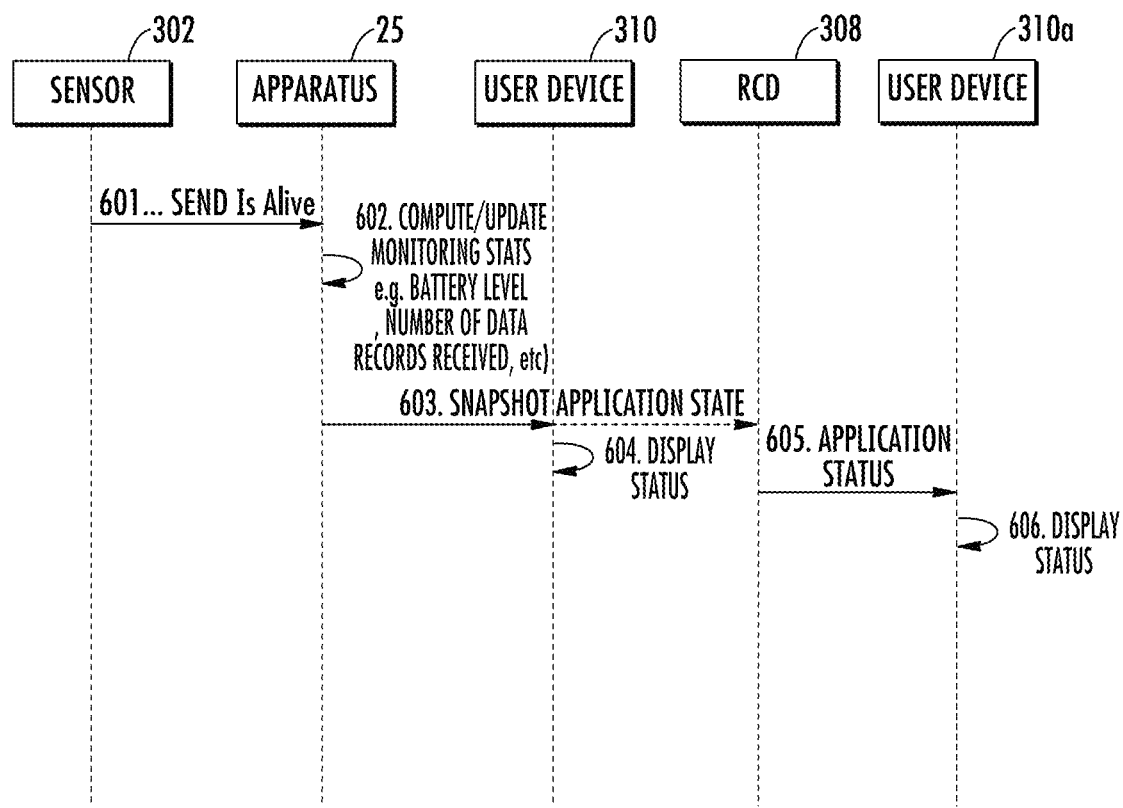

FIG. 6 is a flowchart of operations that may be performed according to an example embodiment for monitoring the state of sensor 302, associated objects 300, and/or associated application life cycles. The "isAlive" signal may be sent by one or more sensor 302 and/or associated objects 300, and may include sensor status on various variables (e.g., battery level). Apparatus 25 may log this information and may update the most recent application state and/or monitoring status for provision on one or more user interfaces 22 and/or user devices 310.

In operation 601, apparatus 25 receives an "IsAlive" signal from the sensor 302. In operation 602, the apparatus 25 may compute and/or update an application state and/or a monitoring status associated with the sensor 302 and/or the related object 300. For example, the monitoring status may include a battery level, number of data records received from the sensor 302, and/or the like. In operation 603 apparatus 25 may transmit the application state and/or monitoring status, or a snapshot of the aforementioned, to a remote computing device 308. In operation 604, apparatus 25 may cause a user device 310 and/or user interface 22 to display the state and/or the status. In operation 605, the application state and/or the monitoring status, which may include any sensor data and/or application output data, may be transmitted to a secondary user device, depicted in FIG. 6 as user device 310*a*. In operation 606, the secondary user device 310*a* may display the state and/or the status. The secondary user device 310*a* is provided as an example additional user device, and it will be appreciated that a user may access sensor data, application output data, and/or any data provided by apparatus 25.

Figure 7:
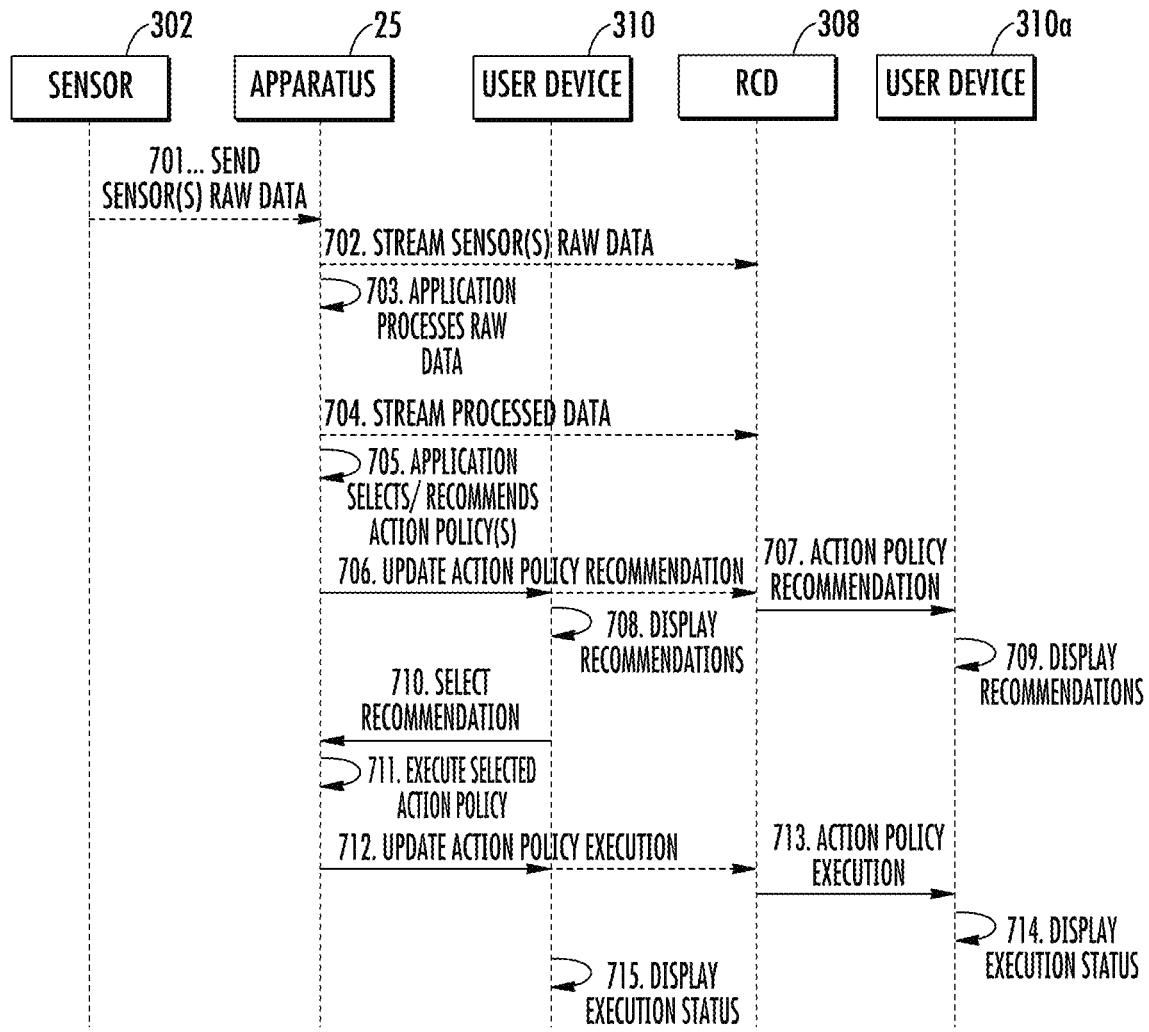

FIG. 7 is a flowchart of operations that may be performed according to an example embodiment for processing raw data (e.g., sensor data) received from the one or more sensors 302, such as during the application life cycle. In operation 701, an apparatus 25 may include, such as a processor 20, a communication interface 24, and/or the like, for receiving raw sensor data from the one or more sensors 302. In some examples, the raw data or sensor data may include configured sensor parameters which may be used for running data integrity tests on the apparatus 25.

In operation 702, the apparatus 25 may be configured, such as with a communication interface 22, for causing streaming and/or causing transmission of the raw data (e.g., sensor data) to a remote computing device 308. In some examples, the raw data (e.g. the sensor data) may be transformed to a predetermined format for streaming or transmission to a remote storage device (e.g., the remote storage device 308). In this regard, the remote storage device 308 may be configured to receive the data in the predefined format.

In operation 703, the apparatus 25 may include means, such as the processor 20, the memory device 26, and/or the like, for processing the raw data (e.g., sensor data). In an example embodiment, operation 703 may include processing the received the raw data (e.g., sensor data) with the application computer program code to generate application output data, such as described with respect to operation 210 above. As another example, the apparatus 25 may process the application computer program code to perform a data integrity test to determine whether the number of data records match a sampling rate that may be indicated by the configured sensor parameters.

As shown by operation 704, the apparatus 25 may include means, such as the processor 20, the communication interface 24, and/or the like, for causing streaming or transmittal of the processed data (e.g., the resultant application output data of operation 703) to the remote computing device 308. In this regard, the raw data (e.g., sensor data) and/or the application output data may be stored on the remote computing device 308.

In operation 705, the apparatus 25 may include means, such as the processor 20 the communication interface 24, and/or the like, for generating and/or providing a list of recommended actionable policies. The actionable policies may be provided based on processing the raw data (e.g., sensor data) and/or the application output data by the application computer code. The actionable policies and may include different options indicating how the raw data (e.g., sensor data) will be processed, and/or what application output data may be generated and/or stored.

In some examples, the actionable policies may include options indicating what sensor data may be received and/or stored (e.g., types of data, frequency, and/or the like). The actionable policies may further indicate to which remote computing devices (e.g., the remote computing devices 306, 308, and/or 450) any of the raw data (e.g., sensor data) and/or application output data may be transmitted. Apparatus 25 may include means, such as processor 20, user interface 22, communication interface 24, and/or the like, for causing the list of actionable policies to be provided via a user interface 22. Apparatus 20 may process the sensor data with the application computer program code according to a user-selected actionable policy from the list of actionable policies. In this regard, the user-selected actionable policy may be a parameter processed by the application computer program code.

Operations 706-710 are operations by which an actionable policy may be selected to be performed and/or implemented by apparatus 25. In operation 706, recommended actionable policies may be updated on and/or provided to the remote computing device 308. In some examples, at operation 707, the list of actionable policies may be provided from the remote computing device 308 to a secondary user device 310. In operation 708 and/or 709, the list of actionable policies may be provided to a user such as via user interface 22, and/or on user device 310 and/or 310*a*. In operation 710, the apparatus 25 may receive a selected actionable policy, such as one provided by the user via user interface 22, user device 310, and/or user device 310*a*, and transmit the selected the actionable policy to the apparatus 25.

In operation 711, apparatus 25 may include means, such as the processor 20, for performing the actionable policy. In this regard, application computer program code may perform operations indicated by the actionable policy, on the sensor data to generate application output data and/or to indicate which sensor data and/or application output data may be transmitted to remote computing devices.

In operation 712, apparatus 25 may include means, such as the processor 20, the communication interface 24, and/or the like, for updating the remote computing device 308 and/or the user device 310 with information regarding the executed policy. For example, an indicator of the selected actionable policy may be stored, or a log of an execution policy that may include a timestamp, may be stored on the remote computing device and/or the user device 310. In operation 713, apparatus 25 may cause information on the remote computing device 308 regarding the executed policies to be provided to the secondary user interface 310a, such as via the user interface 22. In operations 714 and/or 715, the apparatus 25 may cause a status based on the executed policy to be provided to the secondary user device 310a and/or the user device 310.

The actionable policy may include one or more sensor configuration parameters providing information regarding expected data to be received from the one or more sensors 302. In this regard, the apparatus 25 may include means, such as the processor 20, the communication interface 22, and/or the like, for receiving at least one sensor configuration parameter associated with the at least one sensor. The sensor configuration parameter may provide information regarding expected data to be received from the at least one sensor. For example, the sensor configuration parameter may indicate that movement data should be received by the apparatus 25 from the sensor 302. The apparatus 25 may include means, such as the processor 20, for processing configuration computer program code, such as indicated by the selected actionable policy, to perform a data integrity test on at least one of the received sensor data or the application output data based on the at least one sensor configuration parameter.

Figure 8:
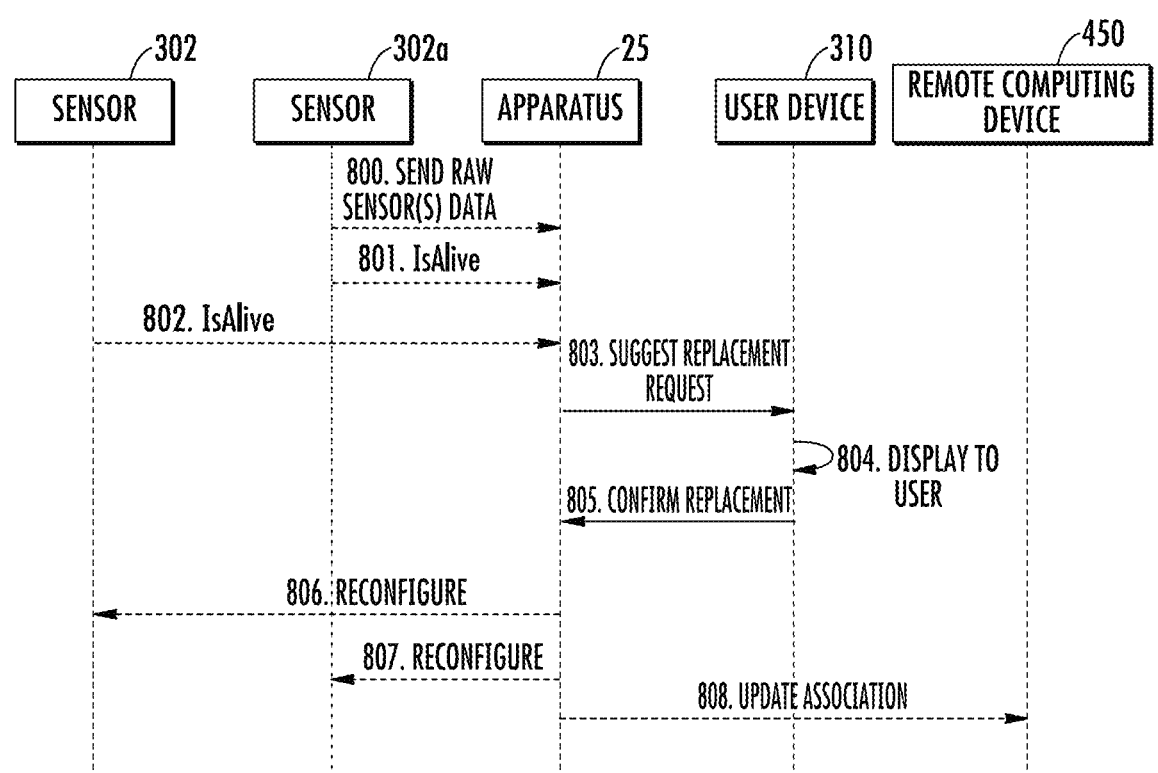

FIG. 8 is a flowchart of operations that may be performed according to an example embodiment. The example operations of FIG. 8 are provided as an example of apparatus 25 identifying a replacement sensor 302. In some examples, the apparatus 25 may receive or access application computer program code that is context-aware and provides or accesses a membership list of associated sensor(s) 302. In an instance the apparatus 25 detects failure of a sensor, such as sensor 302a, the apparatus may suggest a replacement sensor. The replacement sensor 302 may be a sensor which has been paired with the apparatus 25 but may not be a member of any application computer program code and/or associated context.

In operation 800, the sensor 302a may transmit sensor data to the apparatus 25. In operations 801 and 802, the apparatus 25 may receive signals from the sensor 302a and the sensor 302 that the respective sensors are alive, or are communicating with apparatus 25.

Additionally or alternatively, in operation 802, the apparatus 25 may include means, such as the communication interface 22, for receiving an indication of a replacement sensor 302 to replace the sensor 302a.

In an instance the apparatus 25 determines that the received sensor data from the sensor 302a is faulty or includes an indication of an error (e.g., the sensor 302 is not performing expected operations), the apparatus 25 may suggest a replacement request. For example, apparatus 25 may determine that sensor 302 is the replacement sensor for the sensor 302a, based on detecting an association of a similar and/or same associated objects 300 and/or device types of the objects 300. As another example, sensor data received from sensors 302 and/or 302a, when processed, may be indicative of a similar or same application context as is determined from sensor data received from the other of the sensors 302 and/or 302a. For example, sensors 302 and 302a may both provide sensor data for John's fitness tracker, and apparatus 25 may therefore determine that one sensor is the replacement sensor for the other.

In operation 803, the apparatus 25 may include means, such as the processor 20, the communication interface 24, and/or the like, for providing a suggested replacement request to the user device 310 and/or the user interface 22. At operation 804, the apparatus 25 may cause a message to be provided via a user interface of the user device 310 such that the user selects and/or confirms the replacement sensor, and at operation 805, the apparatus 25 receives the selection and/or confirmation of the replacement sensor.

The apparatus 25 may include means, such as the processor 20, for reconfiguring or configuring the sensors 302 and 302a (operations 806 and 807), and/or reconfiguring or configuring the memory device 26, such that the apparatus 25 is paired with the replacement sensor 302 and unpaired with the sensor 302a. Apparatus 25 may be further configured to update an association of the application computer program code to be associated with the replacement sensor 302, and remove the association between the application computer program code and the sensor 302a. Said differently, in response to the indication of the replacement sensor, the apparatus 25 may include means, such as the processor 20 and/or the memory device 26, for disassociating the identifier of the sensor 302a from the application computer program code and associating an identifier of the replacement sensor 302 with the application computer program code.

In this regard, the indication of the replacement sensor may include a user selection or confirmation of the replacement sensor 302, and/or a signal received from the sensor 302. In some examples, apparatus 25 may include means, such as the processor 20, for determining an error relating to the receipt of the sensor data from the sensor 302a. For example, the received sensor data may be incomplete, or otherwise uninterpretable by the apparatus 25. In response to determining the error, the apparatus 25 may include means, such as the processor 20, for generating the indication of the replacement sensor. A signal or request may then be sent by the apparatus 25 to search for the replacement sensor 302, such as based on a type of the associated object 300. For example, if a sensor 302a of a specific brand of fitness sensor is identified as being associated with faulty or erroneous data, the apparatus 25 may search for a replacement sensor 302 associated with the same brand of fitness sensor (e.g., based on a serial number or other unique identifier). In some embodiments, the apparatus 25 may generate the indication of the replacement sensor by determining a received signal comes from the sensor 302 associated with a same or similar object 300 as data previously received via another sensor 302. It will be appreciated that any property or characteristics of the sensors 302 and/or associated objects 300 may be utilized by the apparatus 25 in identifying or determining a replacement sensor.

In operation 808, the apparatus 25 may cause the updated association to be transmitted to a remote computing device 450. The replacement sensor 302 may therefore be added to the membership list indicating an association of the sensor 302 to application computer program code in the apparatus 25.

Figure 9:
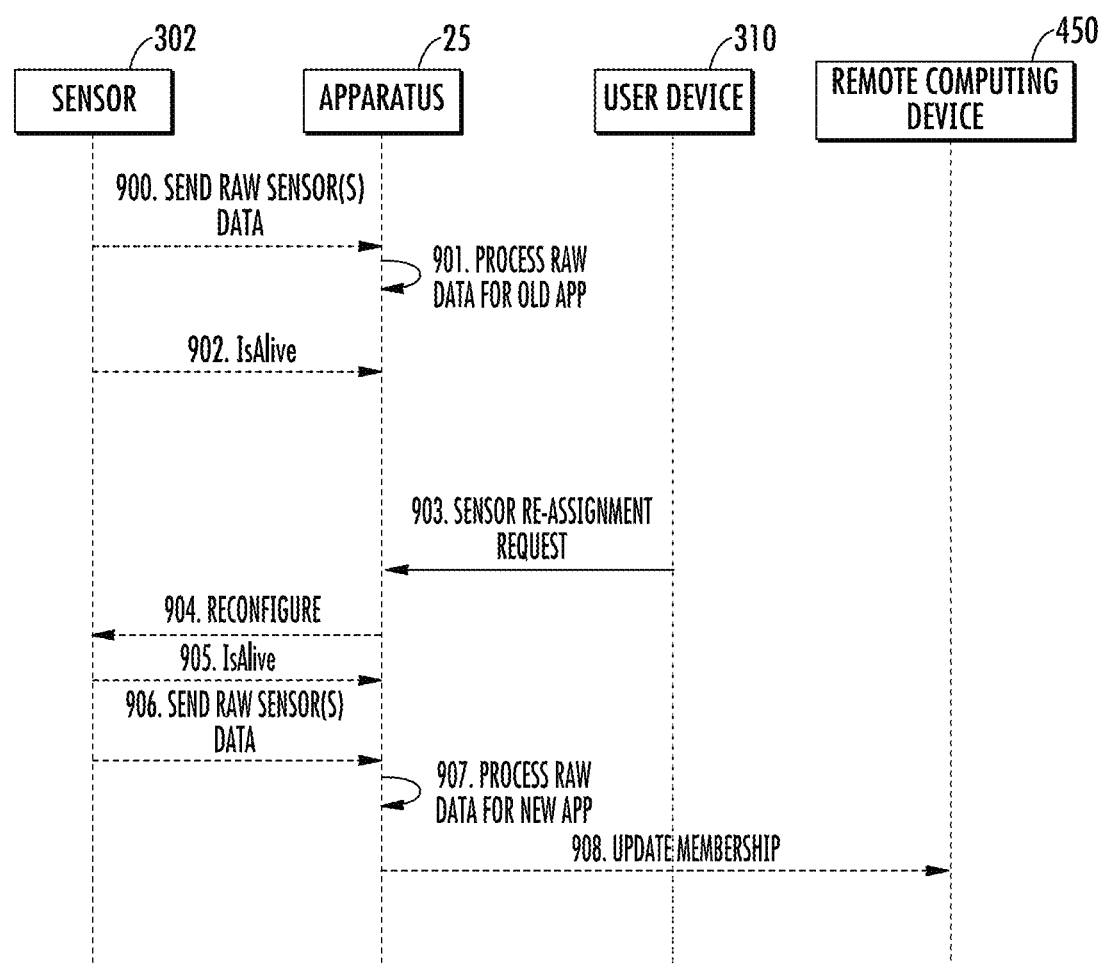

FIG. 9 is a flowchart of operations that may be performed according to an example embodiment for reassigning a sensor 302 to different application computer program code. In some examples, the apparatus 25 may disassociate the sensor 302 from a context-aware application (e.g., application computer program code) because the application service is no longer needed. In such an example, the sensor 302 may be reconfigured or configured by apparatus 25 and dismembered (e.g., disassociated with the application computer program code). However, if a user wants to voluntarily re-assign the sensor 302 to new (e.g., different) application computer program code, the user may make a request such as via a user device 310 and/or user interface 22, and the apparatus 25 may receive the request. The sensor 302 may receive the new configuration request, and continue to transmit sensor data to the apparatus 25, which may cause the sensor data to be processed according to the newly associated (e.g., different) application computer program code.

In operation 900, the apparatus 25 may include means, such as the processor 20, the communication interface 24, and/or the like, for receiving raw data (e.g., sensor data) from the sensor 302. In operation 901, the apparatus 25 may include means, such as the processor 20, and/or the like, for processing the raw data (e.g., sensor data) with the old application computer program code (e.g., current, existing, or any application computer program code stored on the memory device 26 prior to receipt of the new or updated application computer program code). In operation 902, the apparatus 25 may include means, such as the processor 20, the communication interface 24, and/or the like for receiving a signal from the sensor 302 that the sensor 302 "isAlive" and/or is communicating to the apparatus 25. In operation 903, the apparatus 25, may include means, such as the processor 20, the communication interface 24, and/or the like for receiving a request, such as from a user device 310, for reassignment of the sensor 302. Said differently, the apparatus 25 may receive a request for new (e.g., updated and/or replacement) application computer program code to associate with the sensor 302.

In operation 904, the apparatus 25 may include means, such as the processor 20, memory device 26, and/or the like, for reconfiguring or configuring the sensor 302. For example, reconfiguring or configuring the sensor 302 may include associating the sensor 302 with updated application computer program code. In operation 905, the apparatus 25 may include means, such as the processor 20, the communications interface 26, and/or the like, for receiving a signal from the sensor 302 that this sensor "isAlive."

In operation 906, the apparatus 25 may include means, such as the processor 20, the communication interface 24, and/or the like, for receiving raw data (e.g., sensor data) from the sensor 302. In operation 907, the apparatus 25 includes means, such as the processor 20, and/or the like, for processing the raw data (e.g., sensor data) with the new and/or updated application computer program code. In operation 908, the apparatus 25 includes means, such as the processor 20, the communication interface 24, and/or the like for updating membership information on a remote computing device 450, such as by causing transmission of an indication of the association between the sensor 302 and the updated application computer program code.

In an example embodiment according to FIG. 9, the sensors 302 may not only transfer data to the new application and/or application computer program code, but the sensors 302 may have a different meaning and/or sensor context based on the sensor configurations of the new and/or updated application computer program code. Also, according to an example embodiment, if a sensor device 200 (say, having two sensors A and B) is transferred to a new application or updated application, then the new application can optionally shut-off (e.g., power off, or power down) one of the sensors not required (say, sensor A is shut-off) and continue to use sensor B of the sensor device 200. Therefore, an example embodiment may conserve power and/or battery life on the sensor device 200.

Figure 10:
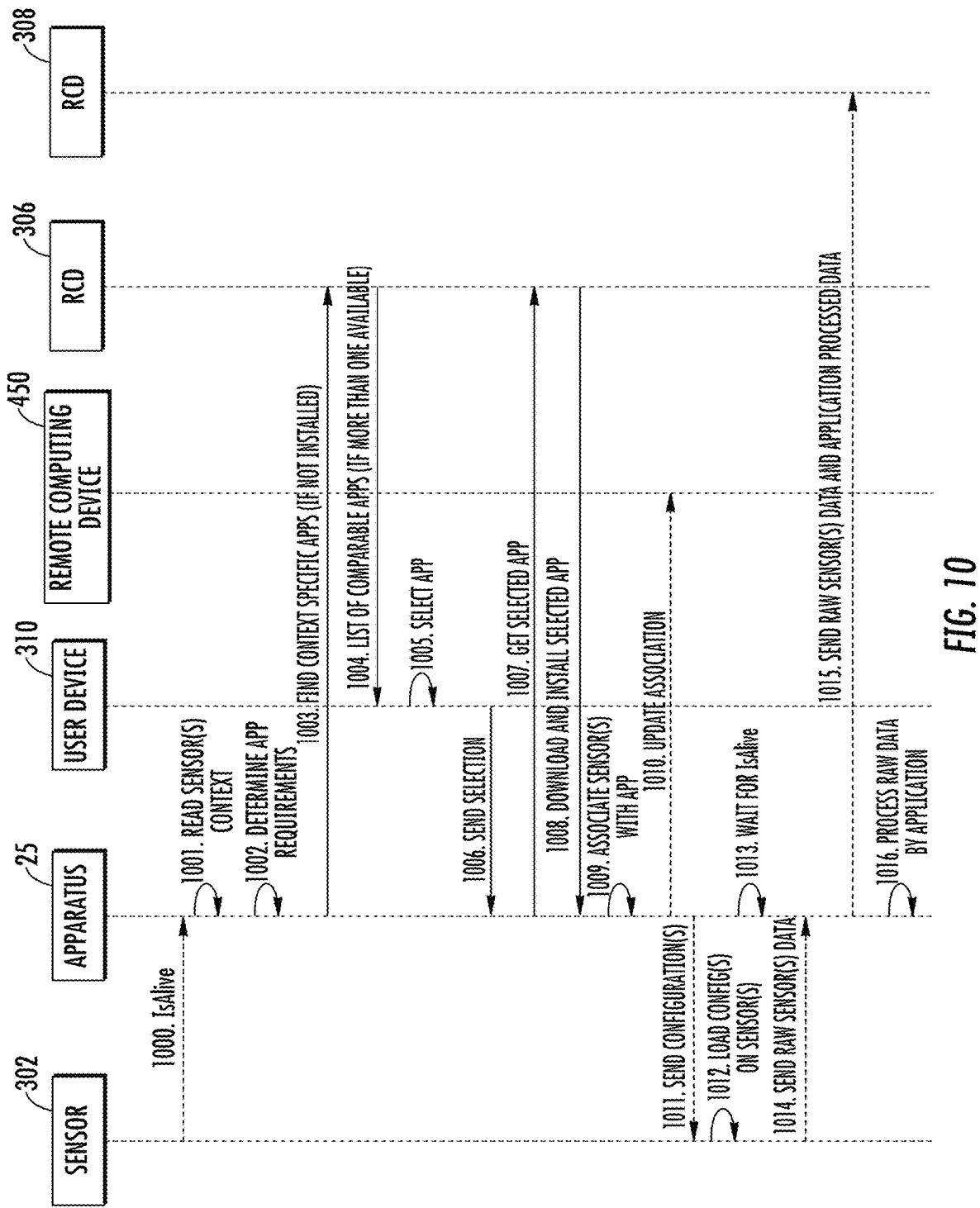

FIG. 10 is a flowchart of operations that may be performed according to an example embodiment for performing an automatic or a semi-automatic application setup. According to an example embodiment, a sensor 302, may be context-aware (e.g., the sensor 302 "knows" which object or object 300 to which it is connected). The apparatus 25 may therefore respond to an "isAlive" signal from the one or more sensors 302 to learn the application context for each sensor. Alternatively, the apparatus 25 can determine the application context for the one or more sensors by analyzing the features and/or nature of the raw data (e.g., sensor data) from the one or more sensors without any prior information to which object a specific sensor is connected to. As another example, the apparatus 25 may determine the application context based on sensor contexts from one or more sensors 302, described below. In some examples, the apparatus 25 may determine an application context based on any combination of raw data (e.g., sensor data) and/or sensor context.

Based on the application context, the apparatus 25 may identify one or more sensors 302 associated with a same object and/or object 300. In some examples, the apparatus 25 may automatically query for compatible "apps," or compatible application computer program products in an app store (e.g., remote computing device 306) based on the application context and/or membership information of the sensors 302. In some examples, if there are compatible application computer program products available, the apparatus 25 may automatically install the code based on some criteria (e.g. most popular, most frequently downloaded, free of charge, already paid, part of subscribed service, and/or the like), and/or optionally ask the user for feedback regarding which application to install. In this regard, the application setup process may be considered automated and/or partially automated.

In operation 1000, apparatus 25 may receive an "isAlive" signal from one or more sensors 302. In operation 1001, the apparatus 25 may include means, such as a processor 20, and/or the like for determining a sensor context for the one or more sensors 302, such as by processing raw data (e.g., sensor data) with an application computer program code. In operation 1002, the apparatus 25 may include means, such as the processor 20 and/or the like for determining application requirements based on the sensor context. The sensor context may be considered a sensor relative to object 300 the sensor 302 is connected to. The sensor device 200 may therefore be considered to be context-aware. According to an example embodiment, the context awareness is built into the sensor device 200, whereas sensors according implemented without the advantages of certain embodiments described herein may not have the notion of context awareness.

In operation 1003, the apparatus 25 may include means such as the processor 20, the communication interface 24 and/or the like for searching for one or more context-specific applications based on the determined application requirements and/or the sensor context, for example the apparatus 25 may query the remote computing device 306. In some examples, the apparatus may query the remote computing device 306 if an associated application is not already installed. In one alternative embodiment, the process may directly continue from operation 1008. After receiving the request for the one or more context-specific applications, the remote computing device 306 may deliver, e.g. transmit, a matching context-specific application to the apparatus 25 for downloading and installation.

In operation 1004, a list of compatible applications may be received from the remote computing device 306 by the apparatus 25 and/or displayed by a user device 310 and/or a user interface 22. The user may make a selection in operation 1005, and the selection may be transmitted to the apparatus 25 in operation 1006. In operations 1007 and 1008, the apparatus 25 may include means, such as the processor 20, the communication interface 24, and/or the like, for requesting, downloading, receiving, and/or installing the selected application (e.g., application computer program code) such as from the remote computing device 306. In operation 1009, the apparatus 25 may include means, such as the processor 20, the memory device 26, and/or the like, for associating the application computer program code with the one or more sensors 302. Further, the apparatus 25 may include means, such as the processor 20, the memory device 26, and/or the like, for creating configuration information based on the application computer program code for the one or more sensors 302. In operation 1010, the updated association and/or the configuration information may be transmitted and stored on a remote computing device, such as a remote computing device 450. In operation 1011, the configuration information may be transmitted from the apparatus 25 to the one or more sensors 302, and the configuration may be loaded or stored on the one or more sensors 302 in operation 1012. In this regard, the one or more sensors 302 are configured to transmit desired raw data (e.g., sensor data) to the apparatus 25 as indicated by the configuration. In some examples, the configuration may indicate the frequency or schedule at which the data is transmitted. In some examples, at operation 1013, the apparatus 25 receives an "isAlive" signal from the sensor 302, and the raw data (e.g., sensor data) is transmitted from the sensor 302 to the apparatus 25 at operation 1014.

In some examples, at operation 1015, the apparatus 25 may include means for, such as the processor 20, the communication interface 24, and/or the like, for causing transmittal of the raw data (e.g., sensor data) to remote computing device 308. In operation 1016, the apparatus 25 may process the raw data (e.g., sensor data) with the application computer program code to generate application output data. The application output data may be further transmitted to remote computing device 308. In some examples, operation 1016 may occur prior to operation 1015.

Figure 11:
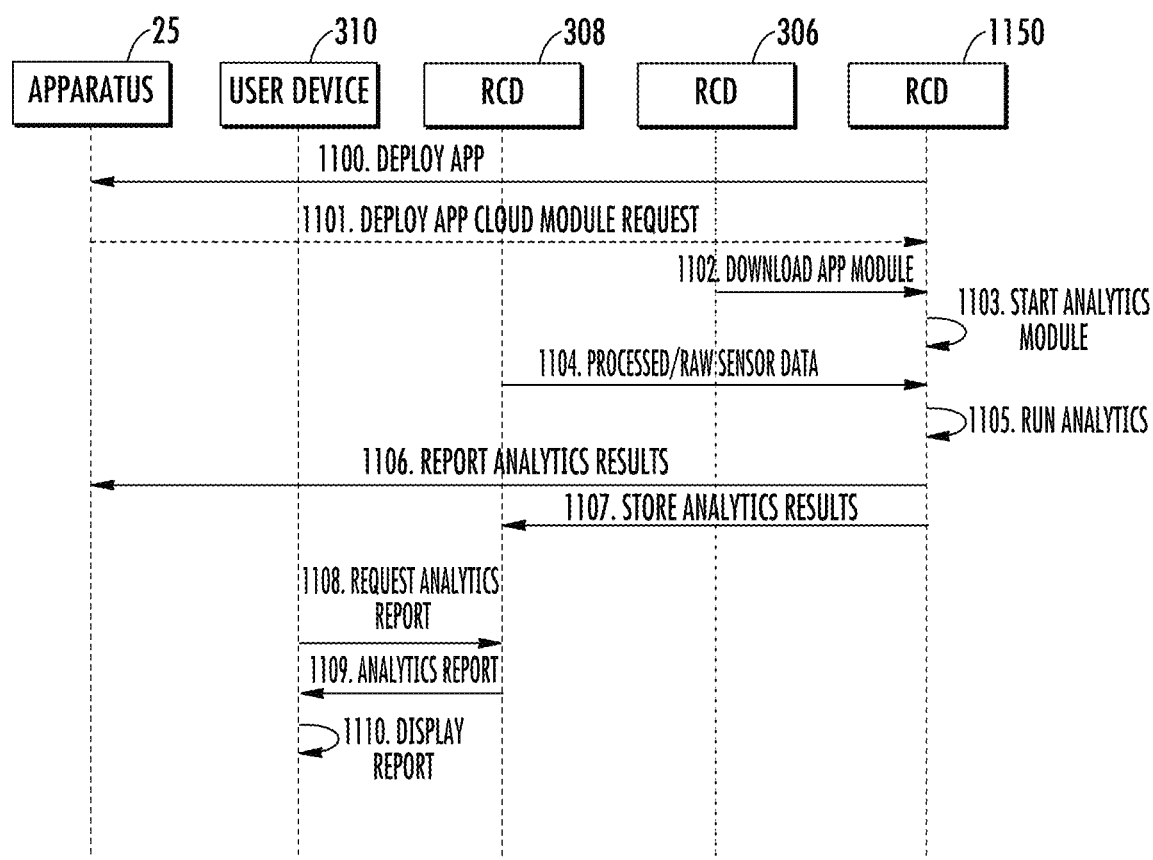

FIG. 11 is a flowchart of operations that may be performed according to an example embodiment for performing analytical processes on the generated application output data.

The remote computing device 1150 may be implemented on remote computing device 306, 308, 450, and/or the like, for example, and may be configured to provide analytical services to apparatus 25. In this regard, remote computing device 1150 may be considered a remote analytics device. In some examples, the analytical services may be performed by apparatus 25. According to some embodiments, the remote computing device 1150 may be embodied by an apparatus, such as apparatus 25. In some examples, the remote computing device 1150 may be implemented as a server, such as an application server, configured to host computer programming code including analytical services. For example, the remote computing device 1150 may be considered a dedicated cloud-based analytical service. In some examples, the remote computing device 1150 may be configured as a distributed system in a network.

In some examples, some analytical processes may be performed by apparatus 25, and/or some analytical processes may be performed on the remote computing device 1150. For example, the apparatus 25 and/or the remote computing device 1150 may perform iterative analytics, big-data analytics, and/or user-defined analytics. In this regard, the remote computing device 1150 may utilize and/or require more processing power and/or resources than those desired to be implemented on the apparatus 25. Technical advantages may be provided by performing the relatively more resource intensive analytical processes on the remote computing device 1150, and relatively less resource intensive analytical processes on the apparatus 25. Accordingly, in some embodiments, the apparatus 25 may outsource analytical processes, or some parts of the analytical processes, to the remote computing device 1150. After the remote computing device 1150 has generated one or more reports based on the one or more analytics, analytics processes, and/or application output data, they may be viewed on any number of the user devices 310.

In this regard, the apparatus 25 may include means, such as the processor 20, the memory device 24, the communication interface 24, and/or the like, for causing transmission of the application output data and/or the raw data (e.g., sensor data) to a remote computing device, such as remote computing device 308. The apparatus 25 may include means, such as the processor 20, the memory device 24, the communication interface 24, and/or the like, for, in response to a request for analytics data related to the sensor data, causing a remote analytics device, such as remote computing device 1150, to (a) access the application output data and/or the raw data (e.g., sensor data) on the remote computing device 308, (b) analyze and/or process the application output data and/or the raw data (e.g., sensor data) to generate the analytics data, and (c) cause transmission of the analytics data to the apparatus 25. Apparatus 25 may include means, such as the processor 20, the user interface 22, and/or the like, to cause the analytics data to be provided via a user interface, such as the user interface 22 and/or on the user device 310.

As illustrated, in operation 1100, the application computer program code may be deployed on the apparatus 25. In operation 1101, apparatus 25 may include means, such as the processor 20, the communication interface 24, the memory device 26, and/or the like, for processing the application computer program product code, and, in response, initiating a request to remote computing device 1150, such as to perform analytical processes.

In some examples, in operation 1102, the apparatus 25 may direct the remote computing device 1150 to download an analytical application computer program code from remote computing device 306. In some uses cases, the remote computing device 1150 may request and download a specific analytical application computer program code that relevant to the application computer program code. In operation 1103, the remote computing device 1150 may perform the analytical processes by processing the analytical application computer program code. In some examples, this may include, at operation 1104, receiving the raw sensor data such as from the remote computing device 308 and/or the apparatus 25. In operation 1105, the remote computing device 1150 may continue and/or complete analytical processes with the downloaded analytical application computer program code. In operation 1106, the results of the analytical process may be provided to the apparatus 25, and/or in operation 1107, to the remote computing device 308 for storage. In some examples, at operation 1108, the user device 310 may request analytical reports via the user device 310 and/or user interface 22. At operation 1109, an analytical report may therefore be transmitted to the user device 310, and at operation 1110, the analytical report may be displayed via the user device 310 and/or the user interface 22.

Figure 12:
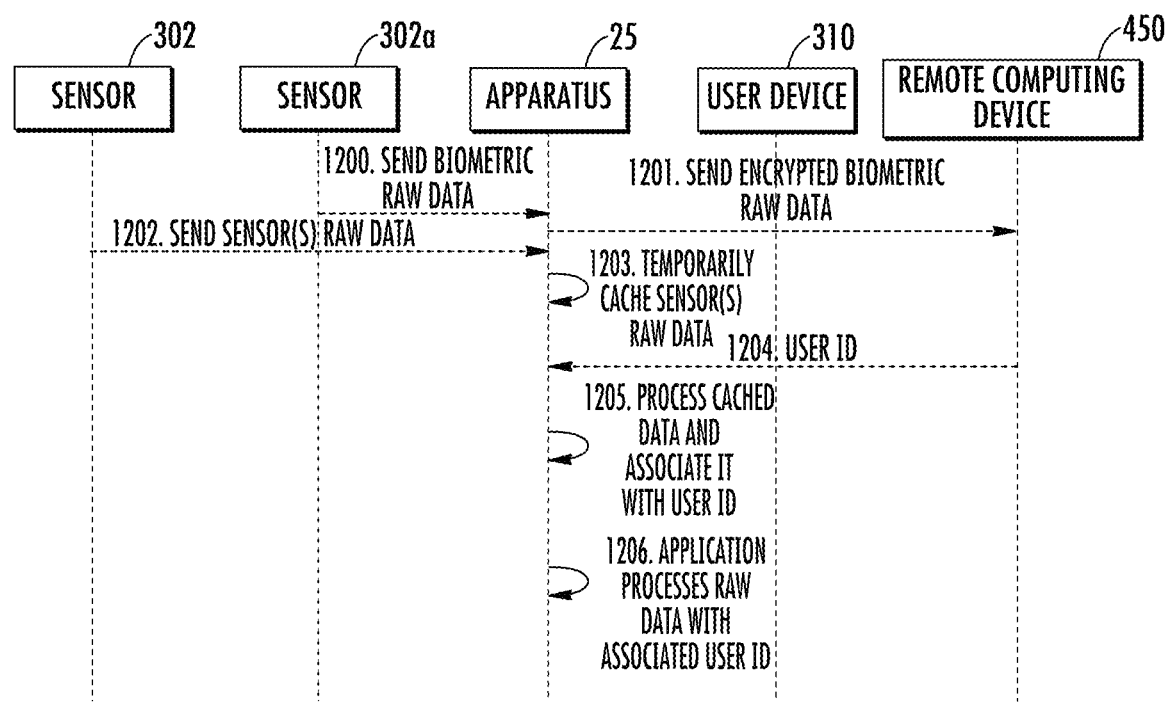

FIG. 12 is a flowchart of operations that may be performed according to an example embodiment for configuring the apparatus 25 to be compatible with one or more users, such as multiple users in the same household. In this regard, various users may use a same user object 300 and related one or more sensor(s) 302 and the raw data (e.g., sensor data) may be associated with a specific user for which the data was generated, stored, analyzed and/or detected. In some examples, the apparatus 25, such as with the processor 20, and/or the like, may receive biometric sensor data from a sensor 302.

FIG. 12 depicts a biometric sensor 302a. The sensor 302a configured to detect biometric data may be the same sensor 302 that provides sensor data to apparatus 25, or one of a plurality of sensors 302 on the object 300, for example (and may, in some examples, be separate from sensor 302). For example, a fingerprint sensor or an eye scanner, such as the sensor 302a, may be attached to an object 300, and may be configured to collect and/or detect the sensor data that is biometric data.

In operation 1200, the biometric data may be transmitted to and/or received by apparatus 25 from the biometric sensor 302a. In operation 1201, the apparatus 25 may include means for, such as the processor 20, the communication interface 24, the memory device 26, and/or the like, for encrypting the biometric sensor data and/or causing transmittal of encrypted biometric sensor data to a remote computing device 450. In this regard, the apparatus 25 may request the remote computing device 450 to identify a user associated with the biometric data.

In operation 1203, the apparatus 25 may include means, such as the processor 20, the memory device 26, and/or the like, for temporarily caching sensor data from sensor 302 and/or 302a received in operation 1202. The apparatus 25 may include means, such as the processor 20, the memory device 26, and/or the like, for, prior to receiving a response from the remote authentication device indicating a user identifier associated with the biometric sensor data, causing the received sensor data from the at least one sensor to be cached, such as in the memory device 26, including but not limited to a temporary allocation of the memory device 26. In this regard, although not yet associated with a particular user, the sensor data may be stored on the memory device 26 and/or processed by the application computer program code.

In operation 1204, the remote computing device 450 may determine the associated user based on the biometric data, and provide the user identifier to apparatus 25. In response to retrieval or receipt of the user identifier from the remote computing device 450, at operation 1205, the apparatus 25 may include means, such as the processor 20, the memory device 26, and/or the like, for causing storage of the cached sensor data in association with the user identifier.

In operation 1206, the apparatus 25 may include means, such as the processor 20, for processing the data with application computer program code. For example, the apparatus 25 may perform context-based processing and/or determine the application context based on the cached data and the user identifier. In some embodiments, the apparatus 25 may use the user identifier to retrieve a user profile. As such, apparatus 25 may store the sensor data and/or application data in association with the user identifier in an allocation of the memory device 26 (and/or remote computing device 308), that is considered more permanent, or is a different tier of memory, relative to the memory on which the sensor data and/or biometric sensor data is cached prior to the user identification.

Figure 13:
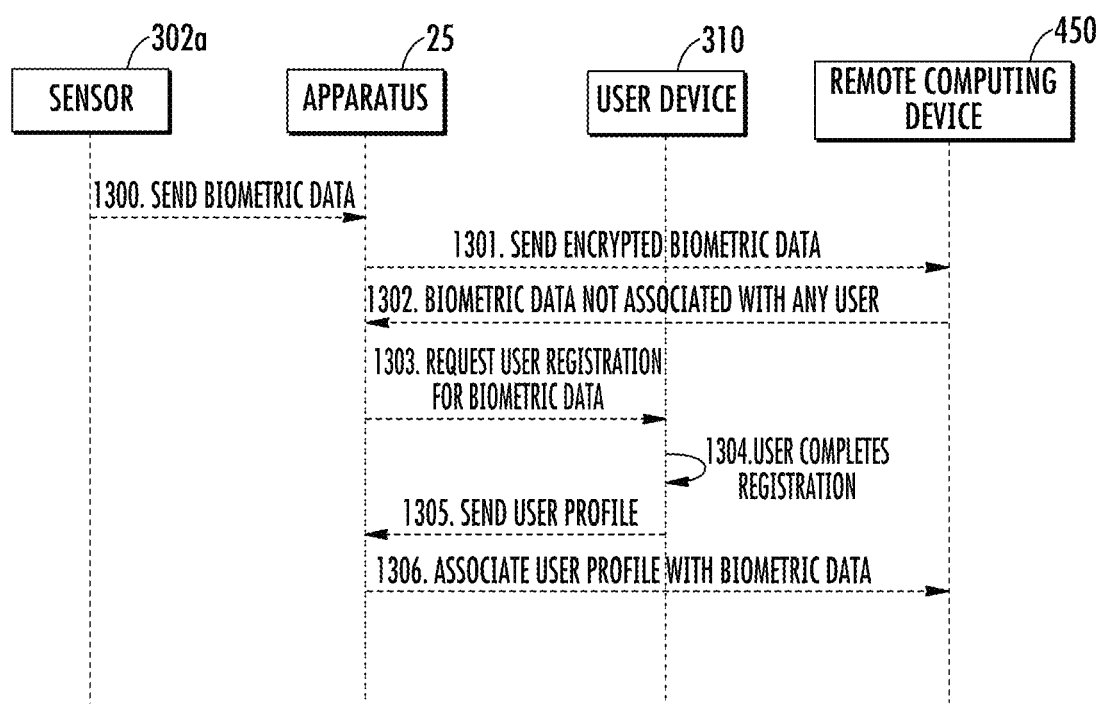

FIG. 13 is a flowchart of operations that may be performed according to an example embodiment for performing user registration. As an example, new users of the user object 300 may touch a biometric sensor 302a. In operation 1300, the biometric sensor data is transmitted to the apparatus 25, which may determine if the sensor data is associated with a registered or previously registered user. In some embodiments, as shown by operation 1301, if no matching user is identified by the apparatus 25, the apparatus 25 may transmit a request to a remote computing device 450. If no matching user is identified based on the biometric data by the remote computing device 450 and/or the apparatus 25 (operation 1302), the apparatus 25, at operation 1303, may cause the user device 310 to provide a request for a user to provide user registration data. For example, in operation 1304, the request may be displayed or otherwise provided to a user, and the user may provide user profile information and/or other registration details via the user device 310 and/or the user interface 22.

In operation 1305, the remote computing device 450 and/or the apparatus 25 may include means, such as the processor 20, the communication interface 24, and/or the like, for causing transmittal of user profile and/or user registration information, such as from remote the computing device 450 to the apparatus 25. In operation 1306, the apparatus 25 may include means, such as the processor 20 and/or the communication interface 24, for causing the user profile information to be associated with the biometric data, such as with the remote computing device 450. In this regard, the user may be registered such that in subsequent use, received biometric sensor data is processed and determined to be associated with the registered user.

As such, the sensor data received by the apparatus 25 may be associated with the user from which the data originated. In this regard, multiple users may use the user object 300 and/or one or more sensors 302, and the associated data may be respectively stored and processed so that analytical processes are performed for an individual user.

An example embodiment provided herein therefore provides many advantages to users. In an example embodiment, users John and Amy acquire an apparatus 25. Since then, they have started attaching their typical household items, such as objections 300, with one or more sensors 302. In addition, they also purchased several other objects 300 that come with one or more pre-integrated with sensors 302. For example, one addition to the household items, including objects 300, is a scale with a weight sensor. The scale can have further a heart rate, a finger print and an air quality sensors 302 either integrated or attached to the scale, and the sensors are configured to communicate seamlessly with the apparatus 25. John paired the new scale and/or the sensors without any difficult with the apparatus 25 and soon after that he started seeing the new metrics user interface 22 with sensor date or sensor data analytics, as provided by the apparatus 25. John and Amy can each see all the connected devices by viewing any of their devices, such as objects 300 and/or user devices 310. Furthermore John and Amy can assign one or more devices to a single person or multiple users in the household. With the new scale device (e.g., object 300), they can now see more additions or updates to application computer program code that can be downloaded to the apparatus 25 and/or the remote computing device to process data collected by sensors 302.

The above scenario is provided merely as an example of benefits of the present disclosure. An example embodiment may be particularly advantageous in the area of personal health and/or preventative health. Items previously considered standard household appliances may be attached/integrated with sensors, such as sensor 302, that may be configured to detect and/or collect personal data, such as fitness data, sleep data, and/or other personal health data.

An example embodiment may therefore improve lives though a more connected and informed understanding of users and their health habits, and may also provide a platform on which larger social and economic benefits can be reaped, such as reversing the rising health costs. An example embodiment increases the footprint of the digital health ecosystem via many typical household devices with built-in digital health integrated via a hub, such as apparatus 25. An example embodiment may therefore promote healthy living, and predictive and/or preventative health care measures.

An example embodiment provides a seamless computer program product, method, and apparatus for collecting health data from various sensors provided from multiple vendors. An example embodiment therefore provides accessibility, entertainment, improved home security, and lowered energy consumption.

As such, the method, apparatus and computer program product of an example embodiment provide numerous technical advantages including the conservation of processing resources and the associated power consumption otherwise expended by a user device, such as object 300. In this regard, apparatus 25 may be configured to communicate with numerous different sensors 302, and perform or otherwise direct remote computing devices (such as any of remote computing devices 306, 308, 450, 1150, etc.), to perform resource-intensive processes, such as data storage, application computer program product hosting, analytical processing, user profile services, and/or the like. In this regard, the objects 300 and/or sensor 302 may be implemented so as to require a relatively small amount of memory and/or processing resources (in comparison to the memory and/or processing resources of apparatus 25, and/or remote computing devices 306, 308, 450, and 1150, for example), or, in some examples, no memory and/or no processing resources. As such, the objects 300 and/or sensors 302 may be implemented in a cost-effective manner, and users may affordably upgrade objects 300 to newer models on a frequent basis without incurring excessive expense and waste of materials.

Similarly, apparatus 25 may be implemented so as to require a relatively small amount of memory and/or processing resources (in comparison to the memory and/or processing resources of remote computing devices 306, 308, 450, and 1150, for example) or, in some examples, no memory and/or no processing resources.

Moreover, in some embodiments, apparatus 25 may be considered to be device agnostic. An examples embodiment may enable seamless connectivity with different sensors, such as personal health tracking smart sensors that may be attached to and/or integrated into typical day to day household devices (e.g. wearable wristbands, headbands, sleep pads, toothbrushes, shoe-pads, socks, scales, etc.).

In some embodiments, apparatus 25 may be considered vendor agnostic, as apparatus 25 may be compatible with sensors 302, such as personal health sensors and/or devices supported across multiple major vendors. In some embodiments, apparatus 25 may be compatible with various different data transfer protocols, such as WiFi, ZigBee, Z-Wave, and/or Bluetooth™ communication. In some examples, apparatus 25 may include a many-to-1 smart translator, enabling conversion of incoming device data of any kind into a pre-defined proprietary format.

Another advantage of an examples embodiment includes enablement of performing analytical processes on data stored on a remote computing device. Further, apparatus 25 provides connectivity to objects 300 and/or user devices 310, such as to a smartphone, to inform users of lifestyle changes, the effect of those changes on personal health, and recommendations to reverse any negative changes. A pre-configured or configurable application programming interface may enable vendors to provide device data compatible with apparatus 25, without extensive changes to their products and/or application computer program code.

As described above, FIGS. 2 and 4-13 illustrate flowcharts of an apparatus 25, method, and computer program product according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present disclosure and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A server apparatus comprising at least one processor and at least one memory including computer program code, the at least one memory and the computer program code configured to, with the processor, cause the apparatus to at least:
receive an indication at the server apparatus of at least one sensor removably attached to an object, wherein the at least one sensor is configured to detect data from the object or environment thereof for provision as sensor data to the server apparatus;
in response to receiving the indication of the at least one sensor, determine application requirements associated with the at least one sensor;
cause transmission of a request from the server apparatus to a remote computing device for compatible application information based on the application requirements associated with the at least one sensor;
receive, at the server apparatus, application computer program code from the remote computing device based on at least the compatible application information;
receive the sensor data at the server apparatus from the at least one sensor;
process the received sensor data with the received application computer program code to generate application output data reflecting information regarding the object or the environment thereof; and
cause transmission of the generated application output data reflecting information regarding the object or the environment thereof from the server apparatus to a user device.

2. The server apparatus according to claim 1, wherein the at least one memory and the computer program code are further configured to cause the server apparatus to at least:
associate an identifier of the at least one sensor with the received application computer program code;
receive an indication of a replacement sensor to replace the at least one sensor; and
in response to the indication of the replacement sensor, disassociate the identifier of the at least one sensor from the received application computer program code and associate an identifier of the replacement sensor with the received application computer program code.

3. The server apparatus according to claim 2, wherein the at least one memory and the computer program code are further configured to cause the server apparatus to at least:
determine an error relating to the receipt of sensor data from the at least one sensor; and
in response to determining the error, generate the indication of the replacement sensor based on a type of the object.

4. The server apparatus according to claim 1, wherein the at least one memory and the computer program code are further configured to cause the server apparatus to at least:
receive the compatible application information from the remote computing device; and
cause the compatible application information to be provided via a user device, wherein the application computer program code is received from the remote computing device based on a user selection.

5. The server apparatus according to claim 1, wherein the at least one memory and the computer program code are further configured to cause the server apparatus to at least:
receive at least one sensor configuration parameter associated with the at least one sensor, wherein the sensor configuration parameter provides information regarding expected data to be received from the at least one sensor; and
process configuration computer program code to perform a data integrity test on at least one of the received sensor data or the application output data based on the at least one sensor configuration parameter.

6. The server apparatus according to claim 1, wherein generating the application output data comprises:
transforming the application output data to a specified format associated with a remote computing device, wherein the remote computing device is configured to receive transformed application output data in the specified format, wherein the application output data is generated from sensor data originating from a plurality of sensors having a plurality of different respectively associated types of objects.

7. The server apparatus according to claim 1, wherein the at least one memory and the computer program code are further configured to cause the server apparatus to at least:
generate a list of actionable policies based on the received application computer program code; and
cause the list of actionable policies to be provided via a user interface, wherein the received sensor data is processed with the received application computer program code according to a user-selected actionable policy from the list of actionable policies.

8. The server apparatus according to claim 1, wherein the at least one memory and the computer program code are further configured to cause the server apparatus to at least:
cause transmission of the application output data to a remote computing device;
in response to a request for analytics data related to the sensor data, cause a remote analytics device to (a) access the application output data on the remote computing device, (b) analyze the application output data to generate the analytics data, and (c) cause transmission of the analytics data to the server apparatus; and
cause the analytics data to be provided via a user interface.

9. The server apparatus according to claim 1, wherein the at least one memory and the computer program code are further configured to cause the server apparatus to at least:
receive biometric sensor data;
encrypt the biometric sensor data and cause transmission of the encrypted biometric sensor data to a remote authentication device;
prior to receiving a response from the remote authentication device indicating a user identifier associated with the biometric sensor data, cause the received sensor data from the at least one sensor to be cached; and in response to receiving the response from the remote authentication device indicating the user identifier associated with the biometric sensor data, cause storage of the cached sensor data in association with the user identifier.

10. The server apparatus of claim 1, wherein the generated application output data indicates a type of the object to which the at least one sensor is removably attached.

11. A method comprising:

receiving an indication at a server apparatus of at least one sensor removably attached to an object, wherein the at least one sensor is configured to detect data from the object or environment thereof for provision as sensor data to the server apparatus;

in response to receiving the indication of the at least one sensor, determining application requirements associated with the at least one sensor;

causing transmission of a request from the server apparatus to a remote computing device for compatible application information based on the application requirements associated with the at least one sensor;

receiving, at the server apparatus, application computer program code from the remote computing device based on at least the compatible application information;

receiving the sensor data at the server apparatus from the at least one sensor;

processing the received sensor data with the received application computer program code to generate application output data reflecting information regarding the object or the environment thereof; and causing transmission of the generated application output data reflecting information regarding the object or the environment thereof from the server apparatus to a user device.

12. The method according to claim 11, further comprising:

associating an identifier of the at least one sensor with the received application computer program code;

receiving an indication of a replacement sensor to replace the at least one sensor; and in response to the indication of the replacement sensor, disassociating the identifier of the at least one sensor from the received application computer program code and associating an identifier of the replacement sensor with the received application computer program code.

13. The method according to claim 12, further comprising:

determining an error relating to the receipt of sensor data from the at least one sensor; and in response to determining the error, generating the indication of the replacement sensor based on a type of the object.

14. The method according to claim 11, further comprising:

receiving the compatible application information from the remote computing device; and causing the compatible application information to be provided via a user device, wherein the application computer program code is received from the remote computing device based on a user selection.

15. The method according to claim 11, further comprising:

receiving at least one sensor configuration parameter associated with the at least one sensor, wherein the sensor configuration parameter provides information regarding expected data to be received from the at least one sensor; and processing configuration computer program code to perform a data integrity test on at least one of the received sensor data or the application output data based on the at least one sensor configuration parameter.

16. The method according to claim 11, wherein generating the application output data comprises:

transforming the application output data to a specified format associated with a remote computing device, wherein the remote computing device is configured to receive transformed application output data in the specified format, wherein the application output data is generated from sensor data originating from a plurality of sensors having a plurality of different respectively associated types of object.

17. The method according to claim 11, further comprising:

generating a list of actionable policies based on the received application computer program code; and causing the list of actionable policies to be provided via a user interface, wherein the received sensor data is processed with the received application computer program code according to a user-selected actionable policy from the list of actionable policies.

18. The method according to claim 11, further comprising:

causing transmission of the application output data to a remote computing device;

in response to a request for analytics data related to the sensor data, causing a remote analytics device to (a) access the application output data on the remote computing device, (b) analyze the application output data to generate the analytics data, and (c) cause transmission of the analytics data; and causing the analytics data to be provided via a user interface.

19. The method according to claim 11, further comprising:

receiving biometric sensor data;

encrypting the biometric sensor data and cause transmission of the encrypted biometric sensor data to a remote authentication device;

prior to receiving a response from the remote authentication device indicating a user identifier associated with the biometric sensor data, causing the received sensor data from the at least one sensor to be cached; and in response to receiving the response from the remote authentication device indicating the user identifier associated with the biometric sensor data, causing storage of the cached sensor data in association with the user identifier.

20. A computer program product comprising at least one non-transitory computer-readable storage medium having computer-executable program code instructions stored therein, the computer-executable program code instructions comprising program code instructions to:

receive an indication at a server apparatus of at least one sensor removably attached to an object, wherein the at least one sensor is configured to detect data from the object or environment thereof for provision as sensor data to the server apparatus;

in response to receiving the indication of the at least one sensor, determine application requirements associated with the at least one sensor;

cause transmission of a request from the server apparatus to a remote computing device for compatible application information based on the application requirements associated with the at least one sensor;

receive, at the server apparatus, application computer program code from the remote computing device based on at least the compatible application information;

receive the sensor data at the server apparatus from the at least one sensor;

process the received sensor data with the received application computer program code to generate application output data reflecting information regarding the object or the environment thereof; and cause transmission of the generated application output data reflecting information regarding the object or the environment thereof from the server apparatus to a user device.

21. The computer program product according to claim 20, wherein the computer-executable program code instructions further comprise program code instructions to:

associate an identifier of the at least one sensor with the received application computer program code;

receive an indication of a replacement sensor to replace the at least one sensor; and in response to the indication of the replacement sensor, disassociate the identifier of the at least one sensor from the received application computer program code and associate an identifier of the replacement sensor with the received application computer program code.

\* \* \* \* \*